US010007942B2

(12) United States Patent
Wickam

(10) Patent No.: US 10,007,942 B2
(45) Date of Patent: Jun. 26, 2018

(54) SYSTEM AND METHODS FOR REAL ESTATE SERVICE PROVIDER RECOMMENDATION

(71) Applicant: Digsview, LLC, Burlingame, CA (US)

(72) Inventor: Brenton Wickam, Hillsborough, CA (US)

(73) Assignee: DIGSVIEW, LLC, Burlingame, CA (US)

(*) Notice: Subject to any disclaimer, the term of this patent is extended or adjusted under 35 U.S.C. 154(b) by 453 days.

(21) Appl. No.: 14/627,929

(22) Filed: Feb. 20, 2015

(65) Prior Publication Data

US 2015/0242919 A1 Aug. 27, 2015

Related U.S. Application Data

(60) Provisional application No. 61/943,215, filed on Feb. 21, 2014.

(51) Int. Cl.
*G06Q 50/16* (2012.01)
*G06Q 30/06* (2012.01)

(52) U.S. Cl.
CPC ..... *G06Q 30/0619* (2013.01); *G06Q 30/0631* (2013.01); *G06Q 50/16* (2013.01); *G06Q 30/0617* (2013.01)

(58) Field of Classification Search
None
See application file for complete search history.

(56) References Cited

U.S. PATENT DOCUMENTS

| 7,089,237 | B2* | 8/2006 | Turnbull | G06F 17/30867 |
| 7,401,025 | B1* | 7/2008 | Lokitz | G06Q 30/0281 705/346 |
| 7,834,883 | B2* | 11/2010 | Adams | G06Q 30/02 345/419 |
| 8,346,624 | B2* | 1/2013 | Goad | G06Q 30/02 705/26.1 |
| 8,442,887 | B2* | 5/2013 | Hamann | G06Q 10/00 705/35 |
| 2002/0103789 | A1* | 8/2002 | Turnbull | G06F 17/30867 |
| 2005/0273354 | A1* | 12/2005 | Adams | G06Q 30/02 345/582 |

(Continued)

FOREIGN PATENT DOCUMENTS

WO WO-2011/113157 A1 * 9/2011

OTHER PUBLICATIONS

Anon., "Zillow Completes Acquisition of Mortech: Expands Professional Services in Zillow Mortgage Marketplace," NASDAQ OMX's News Release Distribution Channel, New York, Nov. 30, 2012.*

(Continued)

*Primary Examiner* — Nicholas D Rosen
(74) *Attorney, Agent, or Firm* — Wilson Sonsini Goodrich & Rosati

(57) ABSTRACT

Systems and methods are provided real estate management. The systems and methods permit a real estate agent to provide personal service provider recommendations to their homeowners. The systems and methods also provide access to information relevant to the homeowners, which may include documents relating to the purchase and/or maintenance of the homeowners' homes.

18 Claims, 29 Drawing Sheets

(56) References Cited

U.S. PATENT DOCUMENTS

| | | | | |
|---|---|---|---|---|
| 2007/0226374 | A1* | 9/2007 | Quarterman | G06Q 30/02 709/250 |
| 2009/0240550 | A1* | 9/2009 | McCarty | G06Q 10/06311 705/7.13 |
| 2010/0082447 | A1* | 4/2010 | Lin | G06Q 30/0601 705/26.1 |
| 2010/0287282 | A1* | 11/2010 | MacLaughlin | G06Q 10/10 709/226 |
| 2011/0137818 | A1* | 6/2011 | Goad | G06Q 30/02 705/347 |
| 2011/0270773 | A1* | 11/2011 | Siekman | G06Q 10/10 705/305 |
| 2013/0041781 | A1* | 2/2013 | Freydberg | G06Q 50/01 705/27.1 |
| 2013/0054276 | A1* | 2/2013 | Hamann | G06Q 10/00 705/4 |
| 2014/0032430 | A1* | 1/2014 | Sieger | G06Q 50/18 705/311 |

OTHER PUBLICATIONS

Angie's List, http://www.angieslist.com, web pages retrieved via the Wayback Machine (www.archives.org), dated Feb. 14, 2014.*
"Zillow website: Property Manager Reviews. Accessed Apr. 27, 2015."*
"Amitree Website. Accessed Apr. 27, 2015."
"Amitree Website: Professionals. Accessed Apr. 27, 2015."
"Angie's List Website. Accessed Apr. 27, 2015."
"Coldwell Banker Concierge and Moving Services Website. Accessed Apr. 27, 2015."
"Coldwell Banker Concierge Website: Recommend a Vendor Form. Accessed Apr. 27, 2015."
"DocuSign website. Accessed Apr. 27, 2015."
"Echosign Website: Adobe Document Cloud. Accessed Apr. 27, 2015."
"Home Advisor Website. Accessed Apr. 27, 2015."
"Home Zada Website. Accessed Apr. 27, 2015."
"Home Zada Website: Home Improvement. Accessed Apr. 27, 2015."
"Home Zada Website: Home Maintenance. Accessed Apr. 27, 2015."
"Homelight Website. Accessed Apr. 27, 2015."
"MLS America's Real Estate Portal Website. Accessed Apr. 27, 2015."
"MLS Webiste: Find Local Pre-Screened Top Rated Home Contractors. Accessed Apr. 27, 2015."
"Realtor Website: Real Estate Agents. Accessed Apr. 27, 2015."
"Realtor Website: Real Estate for Sale. Accessed Apr. 27, 2015."
"Zillow website: Home Improvement Reviews. Accessed Apr. 27, 2015."
"Zillow website: Los Angeles Real Estate Agent reviews. Accessed Apr. 27, 2015."
"Zillow website: Mortgage Lender Reviews. Accessed Apr. 27, 2015."
"Zip Logix Website. Accessed Apr. 27, 2015."
"Zipform Website: DocuSign for Real Estate. Accessed Apr. 27, 2015."
Zillow website: Property Manager Reviews. Accessed Apr. 27, 2015.

* cited by examiner

FIG. 27 (continued below)

| Clients (13) | | | | | |
|---|---|---|---|---|---|
| Show: All Clients ▾ (2740) Sort: A-Z by Name ▾ (2750) | | | | | Search clients |
| NAME | ADDRESS | PHONE | EMAIL | INVITE STATUS | (2730) |
| + Add a Client (2720) | | | | | |
| Anja Pickrell | 1108 Eighth St Catasauqua, PA 18032-2107 | (610) 264-8085 | apickrell@gmail.com | Accepted | |
| Apolonia Abron | 510 Keith Ave Anniston, AL 36207-5863 | (256) 236-5773 | apickrell@gmail.com | Sent | |
| Brian Alles | 30872 Southfield Rd Southfield, MI 48076-1228 | (248) 594-9615 | apickrell@gmail.com | Accepted | |
| Debra Embry | 280 Water St Chattanooga, TN 37410-1351 | (423) 710-3960 | apickrell@gmail.com | Accepted | |
| Dien Abraham | 186 Shelterly Ln Clinton, TN 37716-7717 | (865) 269-4362 | apickrell@gmail.com | Accepted | |
| Gene Johnson | 23 Hart Dr N South Orange, NJ 07079-1930 | (973) 762-6878 | apickrell@gmail.com | Sent | |
| Joe Elkins | 1716 Second Ave N Pell City, AL 35125-1614 | (205) 884-8327 | apickrell@gmail.com | Sent | |
| Kristine Pond | 8965 Delridge Way SW Seattle, WA 98106-1879 | Phone Number | apickrell@gmail.com | Accepted | Delete Resend Invitation |
| Lonna Giffin | 4 Township Rd Downingtown, PA 19335-1201 | (610) 269-3617 | apickrell@gmail.com | Sent | |
| Malena Leventhal | 90 Bellingham Rd Chestnut Hill, MA 02467-3232 | (617) 734-0465 | apickrell@gmail.com | Sent | |
| Mauro Winters | 702 W Waters Ave Tampa, FL 33604-2044 | (813) 854-4303 | apickrell@gmail.com | Sent | |
| Raphael Banter | 3826 Camelot Dr SE, Apt 2B Grand Rapids, MI 48546-8048 | (616) 285-0844 | apickrell@gmail.com | Accepted | |
| Vanessa Martinez | 25 Dale St N Saint Paul, MN 55102-2227 | (651) 209-9780 | apickrell@gmail.com | Sent | |

Digaview helps realtors share resources with homeowners. Still curious? Contact us.    © 2013 Digaview FIG. 27 (continued from above)

SYSTEM AND METHODS FOR REAL ESTATE SERVICE PROVIDER RECOMMENDATION

CROSS-REFERENCE

This application claims the benefit of U.S. Provisional Application No. 61/943,215, filed Feb. 21, 2014, which application is incorporated herein by reference.

BACKGROUND OF THE INVENTION

Traditionally, a homeowner faces challenges when trying to find trusted service providers to help purchase and manage their homes. Oftentimes, once a homeowner has bought a house, there will need to be further work done on the home or maintenance issues may arise, and it is often difficult for homeowners to find trusted service providers to assist with managing their home. Furthermore, there is often no easy way for a homeowner to store, access and share data related to their home.

Currently, there is no effective or efficient way for a real estate agent to maintain relationships and grow relationships post sales with clients that they helped to purchase or sell a home. About 50% of buyers change agents when they decide to sell. Moreover, there is no easy way for a real estate agent to share and manage service provider relationships with homeowners.

SUMMARY OF THE INVENTION

A need exists for improved systems and methods for real estate service provider recommendations. A further need exists for systems and methods where a real estate agent can maintain relationships with their clients and provide service provider recommendations to their homeowners. This may benefit both real estate agents who can continue developing their relationships with their client, and the homeowner who can get personal recommendations for service providers that have been recommended or vetted by the real estate agent.

A platform may be provided which may provide a centralized system through which real estate agent service provider recommendations may be managed and accessed. The platform may also function as a portal or repository for various home-related documents or information. This may provide easy access for homeowners and/or real estate agents to information that they may otherwise have to dig up, or have difficulty finding. The platform may be cloud-based, which can also permit easy access of information from different locations or devices.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

The invention provides systems and methods for real estate service provider recommendation in accordance with aspects of the invention. Various aspects of the invention described herein may be applied to any of the particular applications set forth below or for any other types of recommendation system. The invention may be applied as a standalone system or method, or as part of a real estate tool system. It shall be understood that different aspects of the invention can be appreciated individually, collectively, or in combination with each other.

Aspects of the invention may include a real estate agent-sponsored platform for a homeowner to collect, access and manage home data. This may include personal recommendations of service providers (e.g., vendors) that may be needed by homeowners to help manage their home. This may advantageously provide increased client retention rates for real estate agents. Software as a service (SaaS) and/or mobile platform technology may be used to transform this area.

Figure 1:
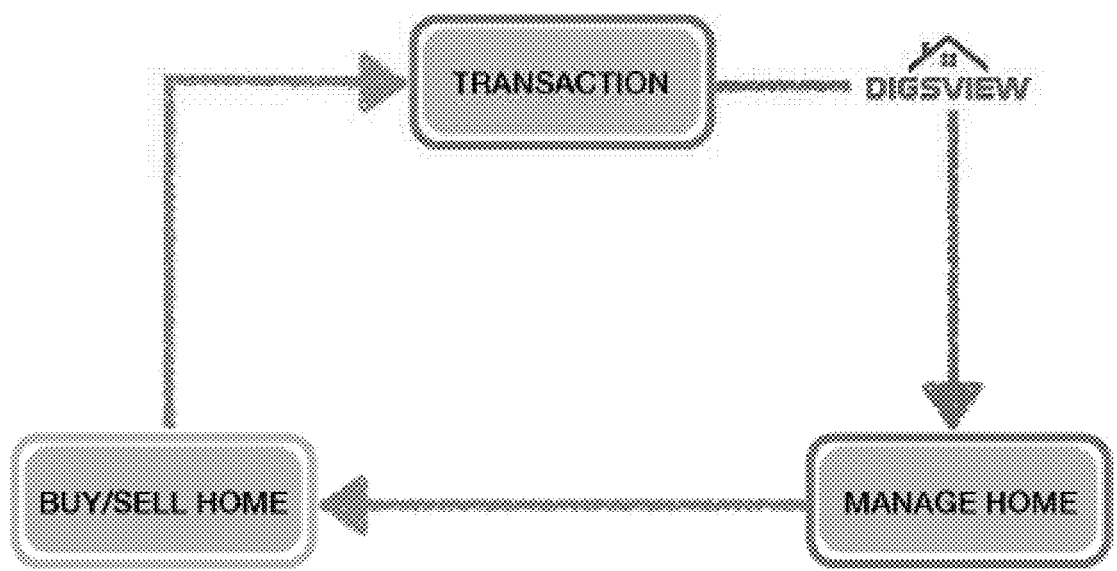
FIG. 1 shows an example of a real estate cycle in accordance with an embodiment of the invention.

FIG. 1 shows an example of a real estate cycle in accordance with an embodiment of the invention. For example, stages may include buying/selling a home, the transaction itself, and the subsequent management of the home. A homeowner may buy a home, undergo the transaction process, manage their home, and then sell their home (and optionally simultaneously buy a new home). After a sale, traditionally, real estate agents (which in some instances may be realtors) may leave clients to fend for themselves, until the next buy/sell home phase. Thus, a weak link exits in the agent/client relationship between the transaction and manage home phase.

The real estate service provider recommendation system (e.g., denoted by the "DigsView" icon) as described further elsewhere herein, may use the need between the transaction and manage home phase to be filled, while strengthening the agent/client relationship. The client can benefit from personal recommendations from a real estate agent for various service providers that may be needed by the client. Examples of service providers/vendors may include but are not limited to architects/engineers, contractors/general contractors, electricians, flooring specialists, roofing specialists, cleaning/maid services, window specialists, painters, landscape architects/gardeners, plumbers, handyman services, pool specialists, driveway services, insulation specialists, heating & A/C, home helper, home inspection, mortgage lenders, or other service providers/vendors. For example, throughout the real estate cycle, needs may arise for use of various service providers, and the homeowner can benefit from the agent's experience and knowledge in the field. In one example, after a homeowner buys a home, he may wish to change the flooring. Rather than randomly sifting through flooring specialists, the homeowner may access the agent's list of personally recommended flooring specialists.

The agent may be in a unique position of interacting with a large number of homeowners and service providers in the home care field, and may thus personally receive direct personal recommendations for various service providers or interact with the service providers him or herself. The agent may be incentivized to only keep service providers that have consistently delivered a high quality of care. This may be advantageous over general review systems where the raters aren't personally accountable for their ratings and do not have a personal relationship with individuals who view their reviews. Thus, the homeowner may benefit from the agent's personal knowledge. The agent may also benefit from remaining connected with the homeowner. The agent may update and/or review the agent's list of recommended service providers. However, the agent may be able to share such recommended service providers through the systems and methods described herein with relatively little labor on the agent's part, and provide a smooth way for the homeowner to access all relevant home information through the platform provided.

Thus, an agent-to-consumer model may be created. A real estate agent may provide leverage and quality assurance over service provider networks, such as the recommended home service providers. Homeowners may be able to search service providers by category from the real estate agent recommendations, and/or provide feedback about their experiences with the service providers. Such feedback may be provided directly to the real estate agent and/or real estate platform, or may be distributed over social media (e.g., Facebook, Google Plus, Twitter, Instagram, LinkedIn, Yelp) or other outlets.

In some embodiments, the agent may be able to provide specialized deals or offers to the homeowner. For example, coupons or VIP deals may be presented to the homeowner. Such deals may be for home-related items or services. For example, one or more service providers may have a coupon or discount that may be presented to the homeowner. The discount may be presented by the real estate agent.

Figure 2:
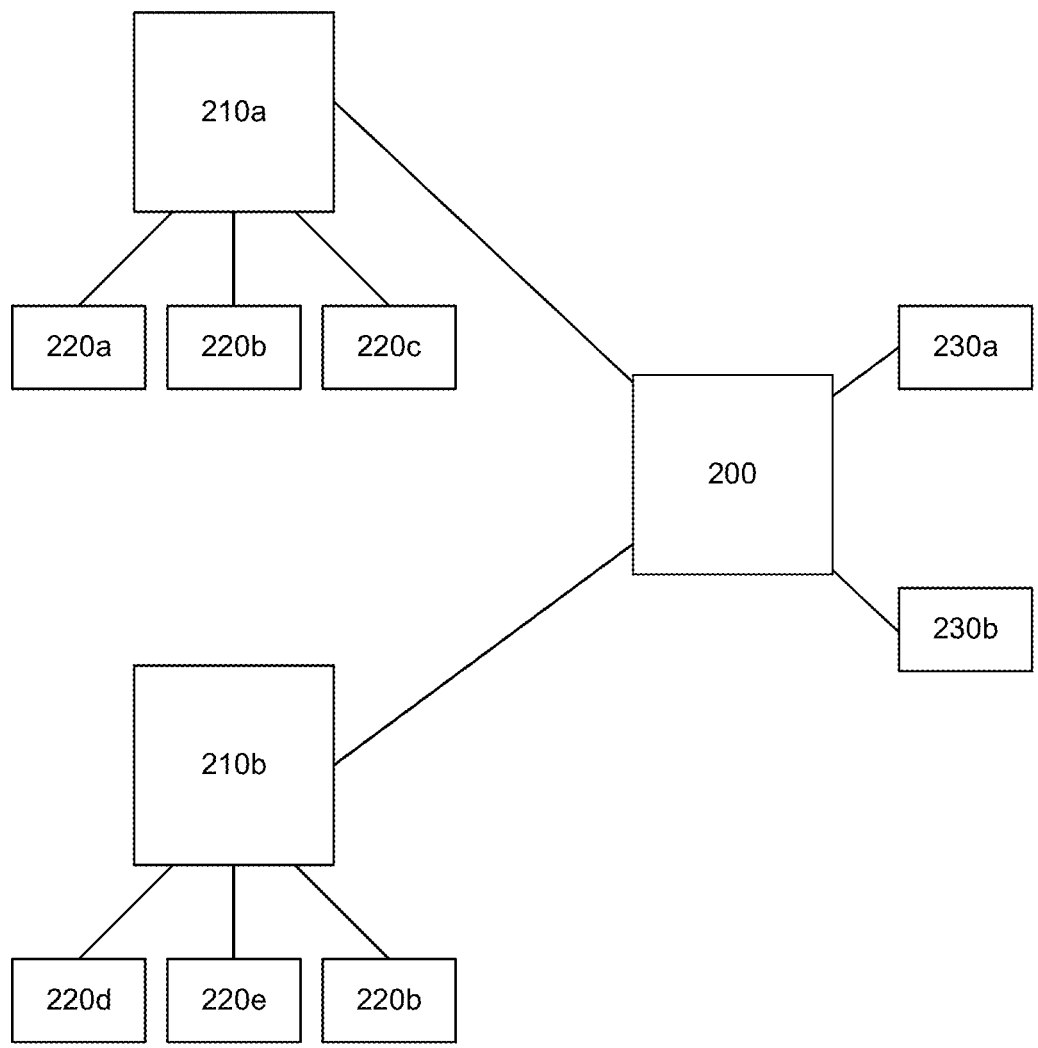
FIG. 2 shows an example of a real estate service provider recommendation system in accordance with embodiments of the invention.

FIG. 2 shows an example of a real estate service provider recommendation system in accordance with embodiments of the invention. A real estate platform 200 may be provided. The platform may be implemented as a SaaS. In some instances, the platform may be accessible via a software or web browser interface or a mobile application. The platform may be implemented with aid of one or more servers. The platform may include one or more memory storage units, such as one or more databases.

The real estate platform 200 may include personalized real estate agent information 210a, 210b. Such information may be stored in the real estate platform, or may be stored elsewhere and accessible via the real estate platform. For example, Real Estate Agent A and Real Estate Agent B may use the real estate platform. Real Estate Agent A's information 210a may be accessible through the platform, and Real Estate Agent B's information 210b may be accessible through the platform.

In some embodiments, the personalized real estate agent information may include service provider recommendations (which in some cases may or may not be referrals) 220a, 220b, 220c, 220d, 220e. In some instances, each real estate agent may have a set of service providers that the real estate agent would personally recommend. Further examples of personalized real estate agent information are described in greater detail elsewhere herein.

In one example, Real Estate Agent A may recommend Service Provider A, Service Provider B, and Service Provider C. The service providers may or may not be in the same area of service. Real Estate Agent B may recommend Service Provider D, Service Provider E, and may also recommend Service Provider B. The service providers may or may not be in the same area of service as each other or the service providers recommended by Real Estate Agent A. Each real estate agent may optionally update their service providers as needed. For example, if a real estate agent encounters a new service provider that the real estate agent would recommend, then the recommender may add the new service provider to their list. If any of the existing service providers start performing poorly or inconsistently, the real estate agent may remove the service provider. The real estate agent may update existing information for existing service providers (e.g., update contact information, notes, etc.).

One or more clients 230a, 230b of the real estate agents may be capable of accessing the real estate platform 200. The real estate platform may serve as a centralized hub through which to access the personalized real estate agent information. The clients may access the personalized real estate agent information of their own real estate agent. For example, if Client A 230a works with Real Estate Agent A 210a, Client A may be able to access the personalized real estate agent information for Real Estate Agent A, including Real Estate Agent A's recommended service providers. If Client B 230b works with Real Estate Agent B 210b, Client B may be able to access the personalized real estate agent information for Real Estate Agent B, including Real Estate Agent B's recommended service providers.

In some implementations, the clients may be able to only access the personalized real estate agent information for their own real estate agent. For example, Client A may only be able to access Real Estate Agent A's information including recommended service providers without being able to access Real Estate Agent B's information (including Real Estate Agent B's recommended service providers). Similarly, Client B may only be able to access Real Estate Agent B's information including recommended service providers without being able to access Real Estate Agent A's information (including Real Estate Agent A's recommended service providers). In such implementations, a client invited by a real estate agent will not be able to view another agent's service provider contacts (optionally unless these contacts pay for placement in another area of the website). In some instances, a real estate agent may have to invite a client, for the client to be able to access his or her information. For example Real Estate Agent A may send an invitation (e.g., electronic link) to Client A, in order for Client A to access Real Estate Agent A's information. In other examples, a client may request to access the real estate agent's information, and the real estate agent may grant permission to the client to access the information. For example, Client B may send a request to Real Estate Agent B to access Real Estate Agent B's personalized information (including Real Estate Agent B's recommended service providers). Real Estate Agent B may grant or deny access to Client B. In some cases, Real Estate Agent B may respond by providing an invitation to Client B. In some instances, a client may only have a relationship with a single real estate agent or only be able to access a single real estate agent's information. Alternatively, a client may have relationships with multiple real estate agents and/or may be able to access multiple real estate agents' information. For example, Client A may be invited or granted access by both Real Estate Agents A and B, and be able to view their personalized information, which may include service provider recommendations.

The real estate platform may enable a real estate agent to manage the real estate agent's service provider recommendation information, and permit one or more clients to access such information, without requiring duplicative efforts of the real estate agent. For example, if a real estate agent were to merely email recommendations to a client at a point in time, and the real estate agent trusted service providers were to change or be updated, the client would not have the most up to date information. Using the real estate platform, the real estate agent may advantageously interact with a single user interface (e.g., managing the real estate agent's list of trusted service providers) and the client may access the information via the real estate platform to receive the most up-to-date information. In some instances, clients may need to use different service providers at different points in time. For instance, years after the client has purchased a home, a plumbing issue may arise and the client may need to find a plumber quickly. The client may access the real estate agent's recommended service provider list through the real estate platform to be provided the real estate agent's most up to date recommendation for a plumber. This would be preferable over a client having to dig through old emails from the real estate agent for plumber information that may no longer even be up to date. This may also be preferable over a client having to email the real estate agent when the problem arises, and awaiting a response from the real estate agent when they may need the information rapidly. The use of the real estate platform may also be advantageous for the real estate agent since the real estate agent would not have to look up information and create separate emails every time a client has a query.

In some instances, alerts or updates may be sent to the clients. For example, whenever a real estate agent changes any service provider information, the client may be contacted (e.g., emailed or texted). In some instances updates may be emailed periodically (e.g., hourly, daily, weekly, monthly, quarterly, yearly). Alternatively, no alerts or updates need to be generated or sent. A client may access the information via the real estate platform on demand to view the most up to date information. When a real estate agent makes a change, the information may be updated at the platform in real-time, so a client accessing the information may be ensured the most up to date information. This may provide a simple way for a real estate agent to distribute a list of his or her most trusted service providers to clients, and only share once (e.g., inviting the client to use the real estate platform or access the real estate agent's information), rather than over and over to capture the most updated information. Thus the platform 200 may be a hub through which information is updated and/or accessed.

Real estate agents and/or clients may be able to interact with the real estate platform through use of one or more devices. Examples of such communication systems are provided further elsewhere herein.

Figure 3:
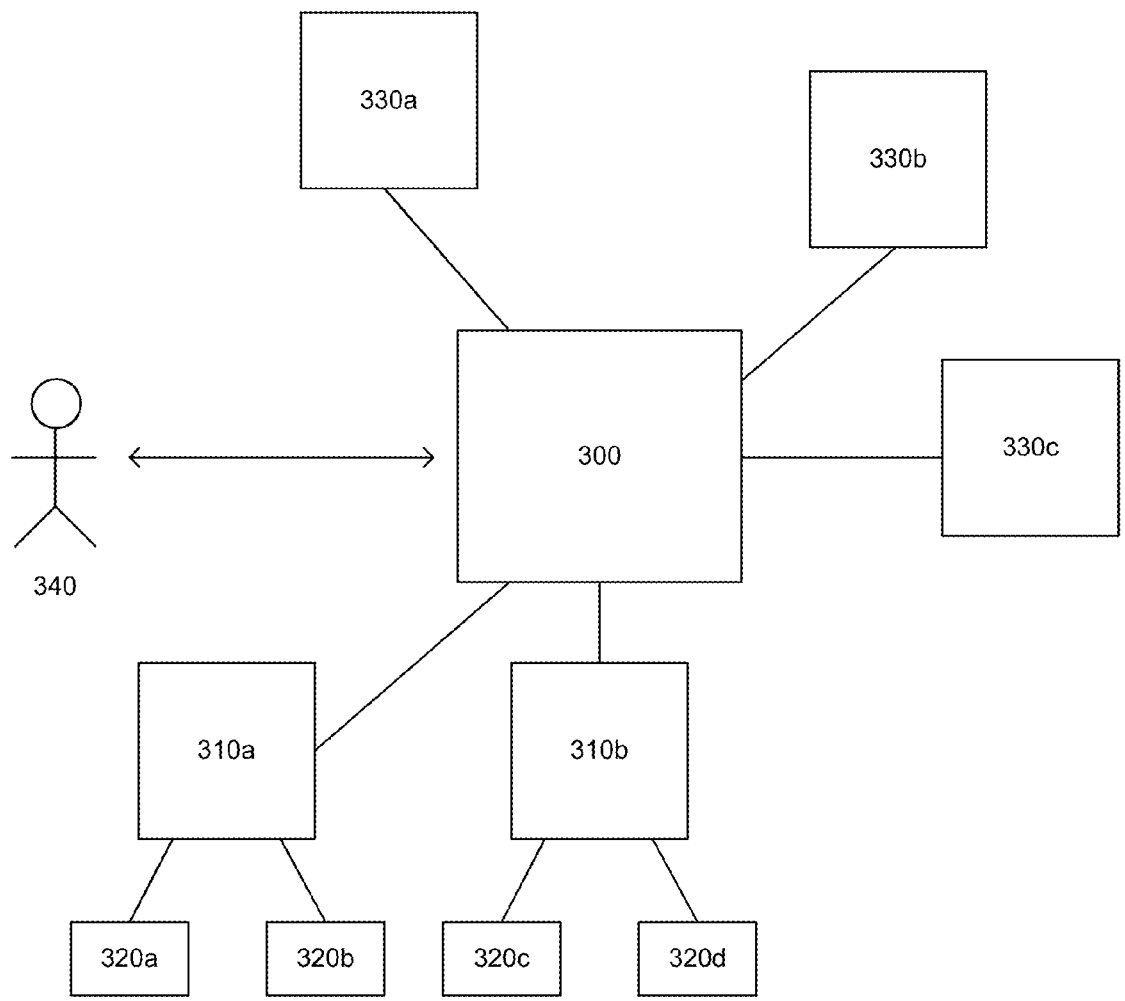
FIG. 3 shows an example of a real estate service provider recommendation system in accordance with embodiments of the invention.

FIG. 3 shows an example of a real estate service provider recommendation system in accordance with embodiments of the invention. A real estate platform 300 may be provided. The platform may be implemented as a SaaS. In some instances, the platform may be accessible via a software or web browser interface or a mobile application. The platform may be implemented with aid of one or more servers. The platform may include one or more memory storage units, such as one or more databases. A user 340 may interact with the real estate platform. The user may be a real estate agent, or buyer/seller of a home.

The real estate platform 300 may include personalized real estate agent information 310a, 310b. As previously discussed such information may be stored in the real estate platform, or may be stored elsewhere and accessible via the real estate platform. The personalized real estate agent information may include service provider recommendations or recommendations 320a, 320b, 320c, 320d. In some instances, each real estate agent may have a set of service providers that the real estate agent would personally recommend. The real estate agent's recommendations along with information about the service providers may be accessible through the real estate platform.

The real estate platform may also include any relevant real property information. For example, such information may include documents, such as home title documents, closing documents, contracts, inspection reports, mortgage or other financial information, floor plans, service history, or any other documents. Such documents may be home or real estate documents. In some instances, electronic versions of the documents may be accessible. The electronic versions may include executed copies of the documents (e.g., signed contracts or agreements). The documents may or may not be provided in an editable format. Information may also include any notes about the home, history relating to the home (e.g., price history, purchase history, service history, inspection history, remodel history), photos or videos of the home, neighborhood or school district information, dimensions or data about the home, home appliances, repair log book, warranties, recent appraisals, or any other information. Such documents or information may be public documents and/or information, or may include private information that may only be accessed by authorized individuals.

In some embodiments, this real property information may be stored by the platform 300. Alternatively, some of the information may be stored off-board the platform and may be accessible by the platform. In some instances, the information may be accessible in real-time. For example, when a user makes a request to access information that is stored off-board (e.g., at an external data source), the information may be accessed in real-time from the off-board memory storage.

One or more other data sources 330a, 330b, 330c may be provided. The information may optionally be stored at the other data sources. The other data sources may be owned and/or operated by entities that are different from the entity operating the platform. Alternatively, a relationship may be provided between the data source entities and the platform entity. The other data sources may be public data sources having information that can be accessed by the public. Alternatively, the data sources may only provide information to approved entities. In some implementations, an entity owning and/or operating the real estate platform may come to an agreement with an entity owning and/or operating an external data source to gain access to information provided by the external data source. In one example, an external data source may be a title company. For example, the title company may carry information relating to contacts/info, warranty offers, and/or exclusive title positions. In some instances, the real estate platform may pull information from no external data sources, one external data source, two or more external data sources, or any number of external data sources. Regardless of whether the platform stores the information or accesses it from other sources, the platform may serve as a portal for the real property information.

One or more users 340 may be capable of accessing the real estate platform 300. The real estate platform may serve as a centralized hub through which the user may access relevant information. In one example, the user may be a homeowner who may wish to access information about his or her home. The relevant documents may be accessible through the platform. The homeowner may have a device through which the homeowner may interact with the platform. The device may have a display which may show a user interface through which the homeowner may interact with the platform. The user interface may display information about the homeowner's home, including documents, such as those described previously, or about the homeowner's real estate agent. The home owner real estate agent information may include personalized information or that real estate agent, which may include the real estate agent's preferred service providers. In another example, the user may be a real estate agent who may wish to access his or her personalized information, or information about his or her clients.

The real estate platform 300 may permit the most up-to-date information to be accessed. For example, information relating to a home may be updated. In one instance, some financial information relating to the home may change. This information may change at an external data source 330a or on-board the platform. When a user makes a request to the real estate platform to view financial information relating to the home, the real estate platform may access the most up-to-date information including the change. The real estate platform may access the external data source if the information is stored off-board, or may access its own memory if the information is stored on-board.

The information may be accessed and/or displayed using one or more components of a real estate management system as described in greater detail elsewhere herein. For example, the user 340 may access the platform 300 through use of one or more user device. Furthermore, the information may be presented on a user interface of the user device, examples of which are provided in greater detail elsewhere herein.

In some instances, some of the information may be automated, such as warranty expirations. In some instances, automated information may be tied to vender recommendations. For example, reminders, such as upcoming warranty expiration dates, may be provided and a homeowner may be recommended to contact certain vendors or types of vendors recommended by the real estate agent.

Figure 4:
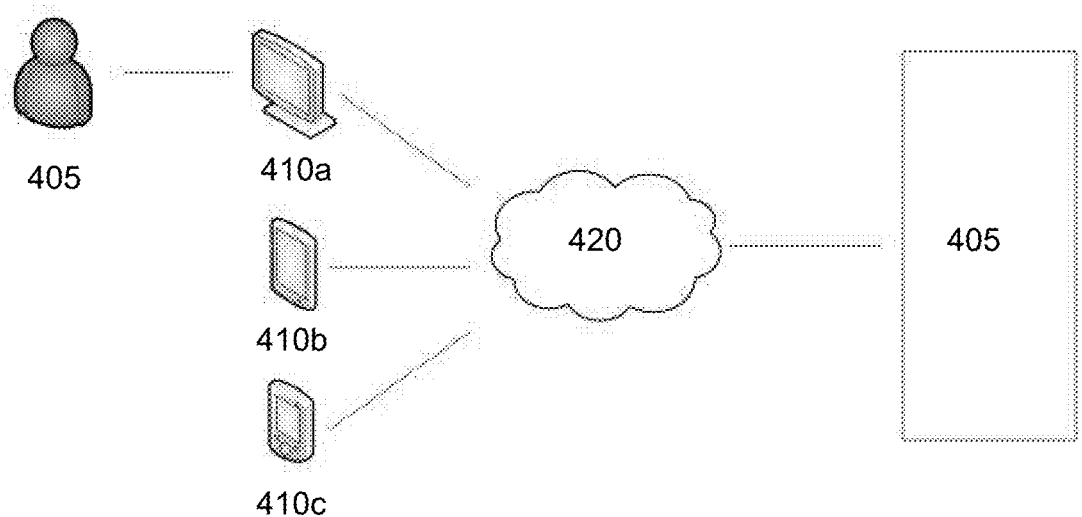
FIG. 4 shows an example of a real estate management system in accordance with an embodiment of the invention.

FIG. 4 shows an example of a real estate management system in accordance with an embodiment of the invention. The system may permit the contribution, organization, and/or display of real estate information, such as home transaction information, home information, personalized real estate agent information (e.g., including real estate agent service provider recommendations), or service provider information. In some embodiments, the real estate management system may be implemented as a web-based application, a mobile app, and the like.

The real estate management system may include a plurality of devices 410a, 410b, 410c. For example a device may be a computer 410a, tablet 410b, or smartphone 410c. In some embodiments, a user 405 may interact with the real estate management system using one or more such devices. The devices may communicate over a network 420 with one or more servers 430. Any depiction of a single server may apply to multiple servers and/or databases. The servers and/or databases may be separate devices or may be integrated into a single device. In some instances a user 405 of the real estate management system may interact with the system over a network 420.

In various embodiments, the user 405 may participate in management of real estate, such as a home. For example, the user may contribute real estate information to the system. For another example, the user may view and/or respond to real estate information provided by the system and/or other users of the system. In some embodiments, the users may include past, present or real estate agents, buyers, or sellers of real properties such as homes.

One or more devices 410a, 410b, 410c may be used to contribute and/or deliver information to and/or from the system. A device may have a display. The display may permit a visual display of information. The display may include a display of a browser and/or application. An application may be a mobile application. A viewable area of the canvas on the display may be a viewport. The display may be provided on a screen, such as an LCD screen, LED screen, OLED screen, CRT screen, plasma screen, touch screen, e-ink screen or any other type of display device. The devices may also include displays of audio information. The display may show a user interface. A user 405 of the system may interact with the device through a user interface. A user may interact via a user interactive device which may include but is not limited to a keypad, touch screen, keyboard, mouse, trackball, touchpad, joystick, microphone, camera, motion sensor, IR sensor, heat sensor, electrical sensor, or any other user interactive device.

Examples of devices 410a, 410b, 410c may include but are not limited to a personal computer, server computer, laptop, tablet (e.g. iPad, Surface tablet, Galaxy Tab), satellite phone, smartphone (e.g., iPhone, Android, Blackberry, Palm, Symbian, Windows), cellular phone, personal digital assistant, Bluetooth device, pager, land-line phone, or any other network device. In some embodiments, the device may be a mobile device. A mobile device may be easily transportable (e.g., tablet, smartphone). In some instances, the mobile device may be a handheld device. The device may be capable of communicating with a network. In some instances, the device may be capable of communicating with the network wirelessly and/or over a wired connection. The device may have a programmable processor and/or a memory. The memory may be capable of storing tangible computer readable media which may comprise code, instructions, and/or logics for one or more steps described herein. The programmable processor may be capable of performing one or more steps described herein in accordance with the tangible computer readable media.

Optionally, the device may have a location-sensing component. For example, a GPS tracker may be provided within the device. The device may communicate with a satellite, cell tower, beacon, or other external device to determine the location of the device.

A user may be exposed to content, such as real estate information via a device. Examples of content may include documents or information relating to a home, or service provider recommendations or information. The content may be presented to the user in visual, audio, or any other suitable type of format. For example, the content may be visually displayed on a web browser or application on the user's device. In various embodiments, the content may be static or dynamic, passive or interactive. For example, the user may interact with the content via the device. For another example, the user may post or respond to information via the device.

In some embodiments, a plurality of devices may be provided for the system. For example, two or more, 10 or more, 100 or more, 1,000 or more, 10,000 or more, 50,000 or more, 100,000 or more, 500,000 or more, 1,000,000 or more, 5,000,000 or more, 10,000,000 or more, 50,000,000 or more, 100,000,000 or more, or 1,000,000,000 or more devices may be provided. In some embodiments, a pre-selected group of devices may be provided.

In some embodiments, the devices may be configured to access one or more servers 430. For example, the devices may be configured to communicate with one or more software components or applications running on the one or more servers, for example, to provide and/or retrieve content to and/or from the system. For another example, the devices may be configured to access and/or display content (such as commercial real estate content) hosted by the one or more servers. In an example, the devices may display in a browser content hosted by the server. The one or more servers may be part of a real estate platform.

In various embodiments, the network 420 may include the Internet, local area network (LAN), wide area network (WAN), personal area network (PAN), a telecommunications network such as a telephone network, cell phone network, mobile network, a wireless network, or any other type of network. Various technologies and methods may be utilized to communicate with the network 420. Such technologies and methods may include wireless technology, such as Bluetooth or RTM technology, dial-up wired connection with a modem, a direct link such as TI, ISDN, cable line or the like. In some embodiments, a wireless connection may be provided by one or more wireless networks such as cellular, satellite, or pager networks, GPRS, or a local data transport system such as Ethernet or token ring over a LAN. In some embodiments, the communication technologies may involve wirelessly communication using infrared communication components.

One, two or more servers 430 may be provided in accordance with an embodiment of the invention. A server may include a memory and/or a processor. The memory may store elements and/or responses to elements. The server may or may not be at a location that is remote to the devices. The server may communicate with the devices over a network such as described above. In some instances, a cloud computing infrastructure may be provided. Any functions described herein may be carried out using a cloud computing infrastructure, such as distributed processing and memory functions. In alternate embodiments, a peer to peer architecture may be utilized by the system.

The server may store data relating to a website or application to be displayed in a browser or app on a user's device. The server may also store data relating to real estate or financial information to be displayed on a user's device. A server may provide content to the devices via the network. In some instances, two-way communication may be provided, where the device may receive a user input and information about the user input may be relayed to the server.

In some embodiments, a server receiving information about a user interaction with a device may or may not be the same as a server providing information to the device. In some instances, one or more third party server, such as a content provider server may provide browser information and/or real estate information to be displayed on a user device. Another set of one or more servers may be configured to receive and/or analyze information from users, or user responses to real estate information. This set of servers may or may not be owned and/or operated by a different entity as the content provider servers.

Real estate information may be displayed on a user interface of a device. Real estate information (which may include service provider information for real properties) may be contributed by one or more participants in the system. Real estate agents, sellers, or buyers may provide and/or view information provided in the system. The information may be useful for home real estate management.

Any descriptions of the user interfaces provided herein may include user interfaces displayed on a device, such as those described herein. The devices may be part of the system.

Figure 5:
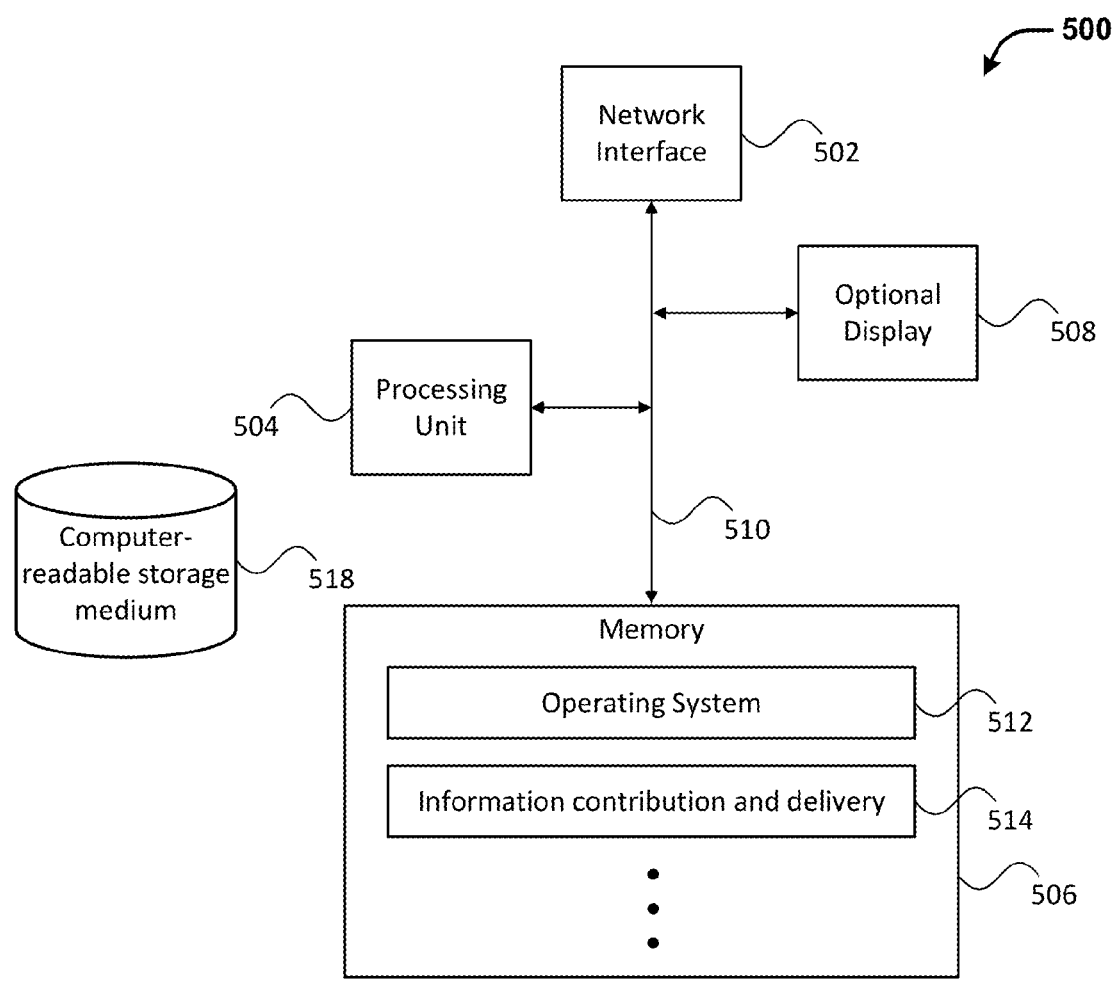
FIG. 5 illustrates example components of a device for implementing aspects of the present invention, in accordance with at least one embodiment.

FIG. 5 illustrates example components of a device 500 for implementing aspects of the present invention, in accordance with at least one embodiment. In some embodiments, the device 500 may include or may be included in the real estate management system discussed in connection with FIG. 4. In some embodiments, computing device 500 may include many more components than those shown in FIG. 5. However, it is not necessary that all of these generally conventional components be shown in order to disclose an illustrative embodiment.

A device 500 (e.g., computing device) includes a network interface 502 for connecting to a network such as discussed above. In various embodiments, the computing device 500 may include one or more network interfaces 502 for communicating with one or more types of networks such as the Internet, wireless networks, cellular networks, and any other network.

In an embodiment, the device 500 also includes one or more processing units 504, a memory 506, and an optional display 508, all interconnected along with the network interface 502 via a bus 510. The processing unit(s) 504 may be capable of executing one or more methods or routines stored in the memory 506. The display 508 may be configured to provide a graphical user interface to a user operating the device 500 for receiving user input, displaying output, and/or executing applications. In some cases, such as when the device 500 is a server, the display 508 may be optional.

The memory 506 may generally comprise a random access memory ("RAM"), a read only memory ("ROM"), and/or a permanent mass storage device, such as a disk drive. The memory 506 may store program code for an operating system 512, one or more information contribution and delivery routines 514, and other routines. In various embodiments, the program code may be stored on a computer-readable storage medium, for example, in the form of a computer program comprising a plurality of instructions executable by one or more processors. The computer-readable storage medium may be non-transitory. The one or more information contribution and delivery routines 514, when executed, may provide various functionalities associated with information contribution and delivery system as described herein.

In some embodiments, the software components discussed above may be loaded into memory 506 using a drive mechanism associated with a non-transient computer readable storage medium 518, such as a floppy disc, tape, DVD/CD-ROM drive, memory card, USB flash drive, solid state drive (SSD) or the like. In other embodiments, the software components may alternatively be loaded via the network interface 502, rather than via a non-transient computer readable storage medium 518.

In some embodiments, the device 500 also communicates via bus 510 with one or more local or remote databases or data stores such as an online data storage system via the bus 510 or the network interface 502. The bus 510 may comprise a storage area network ("SAN"), a high-speed serial bus, and/or via other suitable communication technology. In some embodiments, such databases or data stores may be integrated as part of the device 500.

One or more user interfaces may be provided in order to provide information to a user. As previously discussed, the user may be a real estate agent, or home buyer or seller. Real estate agents and/or homeowners may see the same user interfaces or different user interfaces. Any discussion herein of a user interface presented to a user, such as a homeowner, may also be applied to any other type of user, such as a real estate agent or system administrator.

Figure 6:
FIG. 6 provides an example of a user interface which may show personalized real estate agent information.

FIG. 6 provides an example of a user interface which may show personalized real estate agent information. Such information may include the real estate agent's name 602, contact information, image 604, information about the real estate agent's relationship with the homeowner 610a, 610b, value information 620. For example, information about the real estate agent's relationship with the homeowner may include past transactions 610a, 610b using the real estate agent. This may include information about when the real estate agent sold the homeowner's current home and/or last home. In another example, value information 620 may include information about total value (e.g., total value in coupons or discounts that the real estate agent has gotten for the homeowner over time). Personalized real estate agent information may include information of how the real estate agent has benefitted the homeowner in the past and specifics of past interactions.

The real estate agent user interface may also include interfaces through which the homeowner may contact the real estate agent directly. For example, user input regions 630, such as buttons, drop down menus, or other user interactive displays, may permit a user to directly email, text, call, send vcard, or add contact for the real estate agent. Thus, homeowners may be advantageously presented with a one-click method of communicating with their agent and service providers.

In some instances, a social media option 640 may be presented. For example, a homeowner may be able to "like" or otherwise endorse the homeowner's real estate agent via social media. The user can share information about the real estate agent over social media through the interface. For example, the homeowner can tweet or post about the experience with the agent or service providers. In some instances, all postings on social media may include a link to download software or application for the real estate platform (e.g., DigsView), or create an account with the real estate platform. Alternatively, homeowners may not directly sign up for the real estate platform and may need to be invited by a real estate agent. The postings on social media may provide a simple interface through which a homeowner may make a request to their real estate agent to be invited to the platform. Thus, an easy one-click interface may be provided for connecting the homeowner's experience with the real estate agent to social media.

In some instances a navigation bar 650 or similar navigation interface may be provided. A homeowner may access a platform and have the user interface displayed on his or her device. One portion of the navigation bar may show personalized real estate agent information. Another portion may provide access to information about the homeowner's home. An additional portion may cause the display information relating to the homeowner's zone. Another option may show service providers. These may include trusted service providers that are referred by the real estate agent. In some instances, the service provider information may include personal vendors for the homeowner that may include trusted service providers originally recommended by the real estate agent or gathered from other sources.

In some instances, a region may be presented for new offers 660. For example, notification of a community offer may be presented.

The user interface may be displayed to a client of the real estate agent. In some instances, only clients with relationships (e.g., invited or accepted by the real estate agent) may be able to view the real estate agent's information. The user interface may advantageously permit the real estate agent to update information, and for the user to access the most updated information from the real estate agent. The features that permit quick contact with the real estate agent can aid in maintaining the relationship between the real estate agent and clients.

Figure 7:
FIG. 7 provides an example of a user interface which may show information about a homeowner's home.

FIG. 7 provides an example of a user interface which may show information about a homeowner's home. This information may include information about dimensions and data, home appliances, a repair log book, warranties, and recent appraisals. Optionally, images of the user's home and/or floor plan information may be presented. Any of this information may be accessed through the real estate platform. In some instances, the information may be stored in databases of the real estate platform, or may be stored at external data sources, from which the real estate platform may pull the data to be displayed. Selecting an option may direct a user to another user interface with additional details. For example, a user selecting an option to view a repair log book may cause the user device's display to show further details about past repairs.

In some embodiments, important home-related documents may be accessible through a home information user interface. For example, selecting specific category of home information may direct a user to further information about that category, including any related documents. For example, accessing a recent appraisals section may permit a user to view copies of the actual appraisal reports.

Optionally, the user interface may have an option for a user to request a new appraisal. Selecting an option to request a new appraisal may directly put the homeowner in contact with an appraiser. This may include an appraiser that is recommended by the real estate agent and/or that the homeowner already has on file. Alternatively, the homeowner may be placed in contact with the homeowner's real estate agent who may recommend appraisers to the homeowner. In other examples, several appraiser options may be presented to the homeowner, who may select an appraiser from the options. Thus, an easy one-click interface may be provided in order to initiate the process of the homeowner getting an appraisal of his or her home.

Secure cloud storage may be provided for the homeowner's data. For example, the dimensions, appliances, warranties, repair log, appraisals, etc. may be stored in secured cloud storage that may be owned and/or operated by the platform entity, or by a different entity. The cloud storage may permit users to access the information from anywhere or any device. For example, a user may be out shopping for a new appliance. The user may use the home information to determine whether the appliance will fit the home area or see if it meets the requirements of the home area where it will be utilized.

Figure 8:
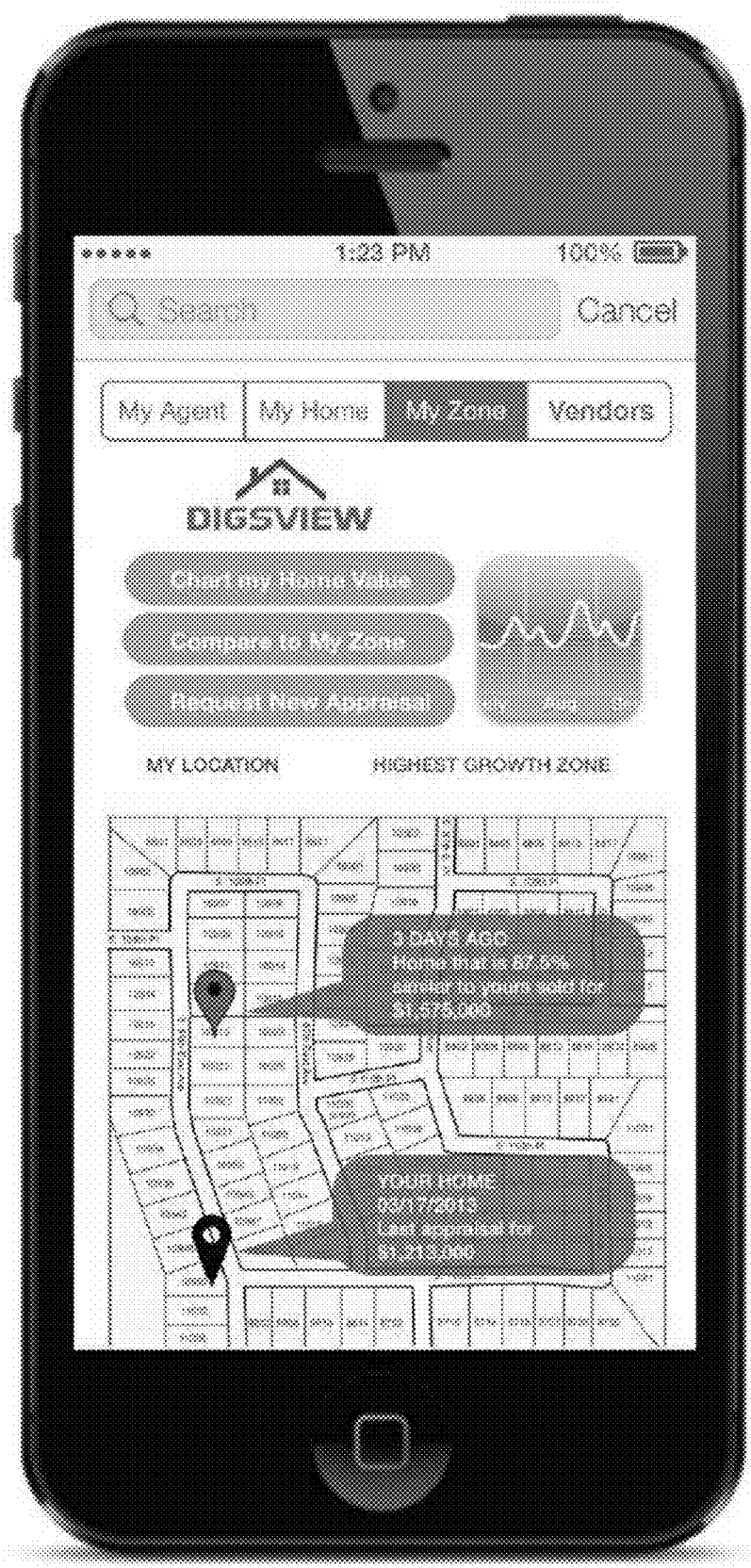
FIG. 8 provides an example of a user interface which may show information about a zone in which a homeowner's home is located.

FIG. 8 provides an example of a user interface which may show information about a zone in which a homeowner's home is located. Options may be presented for the homeowner to chart his or her home value, compare the homeowner's home to the rest of the zone, and/or request a new appraisal. A graphical display may be presented showing the change in the value of the homeowner's home.

Optionally, a visual map may be presented of the zone. The homeowner's home lot may be displayed in the zone. In some instances, sales activity within the zone may be displayed. For example, sale of another home within the zone may be displayed on the visual map. The sale information may be displayed, including price and/or time of sale. In some instances, metrics may be used to compare the sold home with the homeowner's home. A numerical comparison value (e.g., percentage similarity) may be displayed. In some instances, the sales information of the homeowner's home may also be displayed (e.g., time of sale, price at sale or appraised value).

In some instances, a real estate agent may have strong links with clients in a community. The agent may be a good source of informed and detailed information than a random online source. The agent may be a trusted source of information about a community. As agents often focus in certain areas, they may be personally up to date on community information. The real estate agent may use the platform to provide triggers and alerts to keep a client informed about relevant information pertaining to the client's zone or community. This may occur even after a client has purchased a home, thereby strengthening the client/agent relationship and catalyzing buy/sell transactions.

Figure 9:
FIG. 9 provides an example of a user interface which may show information about service providers that may be used in relation to a homeowner's home.

FIG. 9 provides an example of a user interface which may show information about service providers that may be used in relation to a homeowner's home. The user interface may permit a user to search for vendors recommended by a real estate agent. Options may be presented for a user to search all vendors 902, search categories 904, view agent negotiated rates 906, and/or view agent negotiated offers 908. A user may be able to search for vendor by name and/or categories. Further user interfaces for this search is provided elsewhere herein.

A homeowner's real estate agent may have pre-negotiated rates and/or offers with certain service providers. In some instances, the homeowner may only be able to get the pre-negotiated rates and/or offers by contacting the service providers through the real estate agent's recommendation.

Optionally a running total of awards 910 may be displayed on the user interface. For example, the amount of units currency that the real estate agent has saved a homeowner through various reduced rates, discounts, coupons, or other offers may be displayed. For example, if a homeowner uses a plumber that is recommended by the real estate agent, having a pre-negotiated $200 discount, that $200 discount may be reflected in the total awards.

A current offer 930 may be displayed. For example, a coupon may be presented to save at a home-related store or using a service provider. Navigation features 920 may be provided to permit a user to navigate between multiple offers. For example, a user may hit a back arrow to view a previous offer, or a forward arrow to view a next offer.

A region may be presented for additional new offers or communications from the real estate agent 940. For example, note may be presented by a real estate agent reminding the homeowner to contact the real estate agent to personally find a gift or award.

In some embodiments, real estate agents may or may not be financially rewarded for providing vendor recommendations. For example, the platform may track whether a user contacts a vendor through a real estate agent's recommendation on the platform. The vendor may or may not provide financial rewards to the real estate agent. In some instances, the vendor may provide discounts or awards for users who use the vendors through the real estate agent (e.g., the vendor may or may not have pre-negotiated a discount or award with the real estate agent, or may decide to award users in the hopes that this would cause recommendations to continue to come from the real estate agent). The platform may track which users click on a link to access the vendor information and/or contact the vendor through the platform. The platform may track which real estate agent's preferred vendor list that a user is accessing when the user views information about the vendor. The platform may track which real estate agent's preferred vendor list that a user is accessing when the user contacts the vendor through the platform. Such information may be used to provide rewards or discounts to the real estate agent and/or user, or may not have any financial impact on the real estate agent and/or user.

Figure 10:
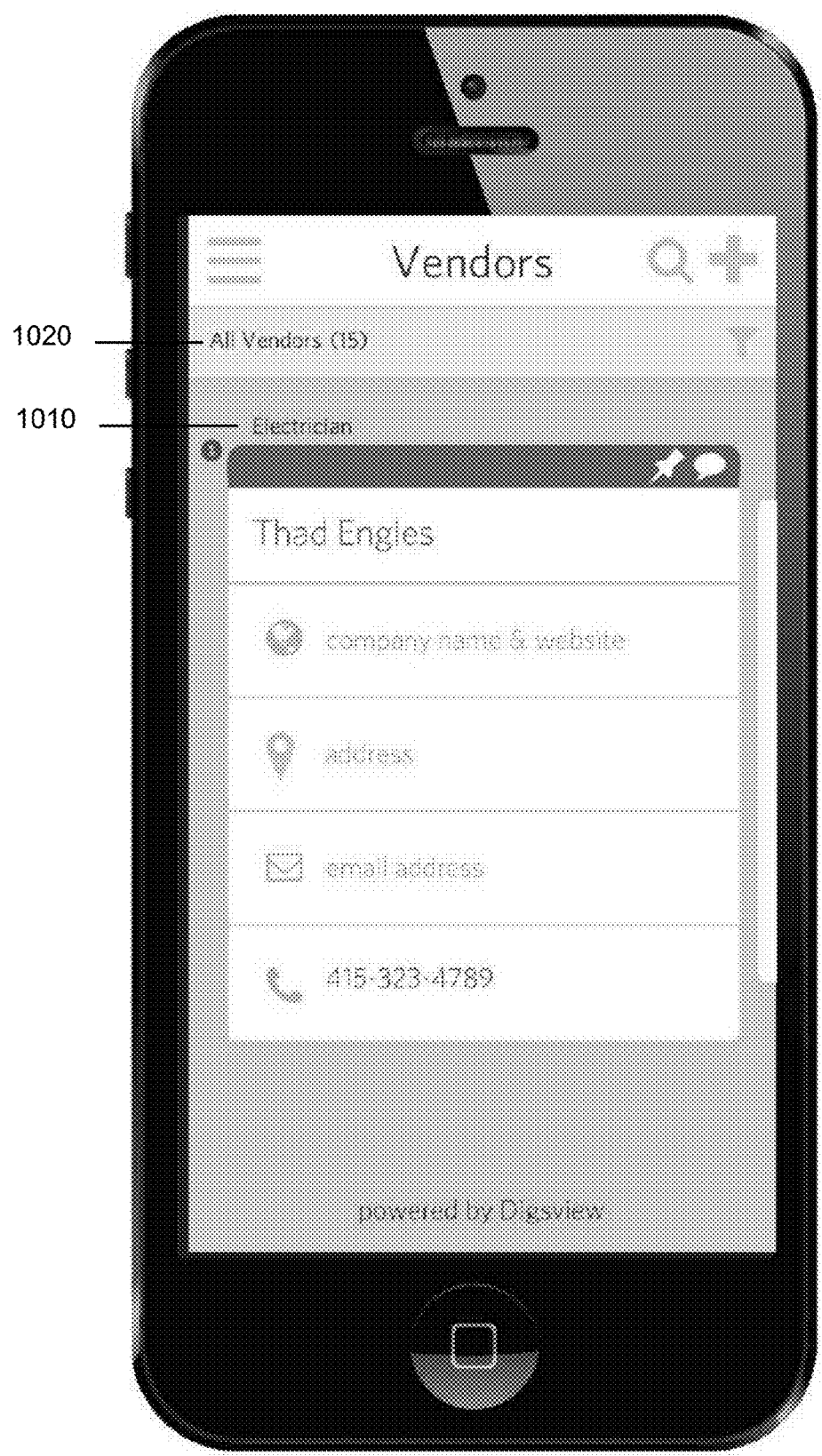
FIG. 10 shows an example of a user interface showing information for a service provider.

FIG. 10 shows an example of a user interface showing information for a service provider. A homeowner may view the user interface to get information for a particular service provider. The service provider name, company name/website, address, email address, and/or phone number may be presented. A user may be able to directly contact the service provider through the contact information presented for the service provider. For example, selecting a phone number may cause the user device to directly call the service provider. In some instances, a service category 1010 to which the service provider belongs may also be displayed. For instance, if the service provider is an electrician, an indicator may be made that the service provider is an electrician. In some instances, the service provider may fit in a single service category. Alternatively, the service provider may fit under multiple service categories, in which case the multiple service categories may be displayed.

In some instances, a service provider pool 1020 may be shown. For example, all vendors may be accessed. The total number of service providers within the pool may be shown. For example, fifteen vendors may be provided within the 'all vendors' pool. In some instances, the service provider pool may be reflective of a category. For example, all electricians may be shown. Alternatively, they service provider pool may be reflective of geography, list (e.g., real estate agent's list, homeowner's list) or other parameters.

Figure 11:
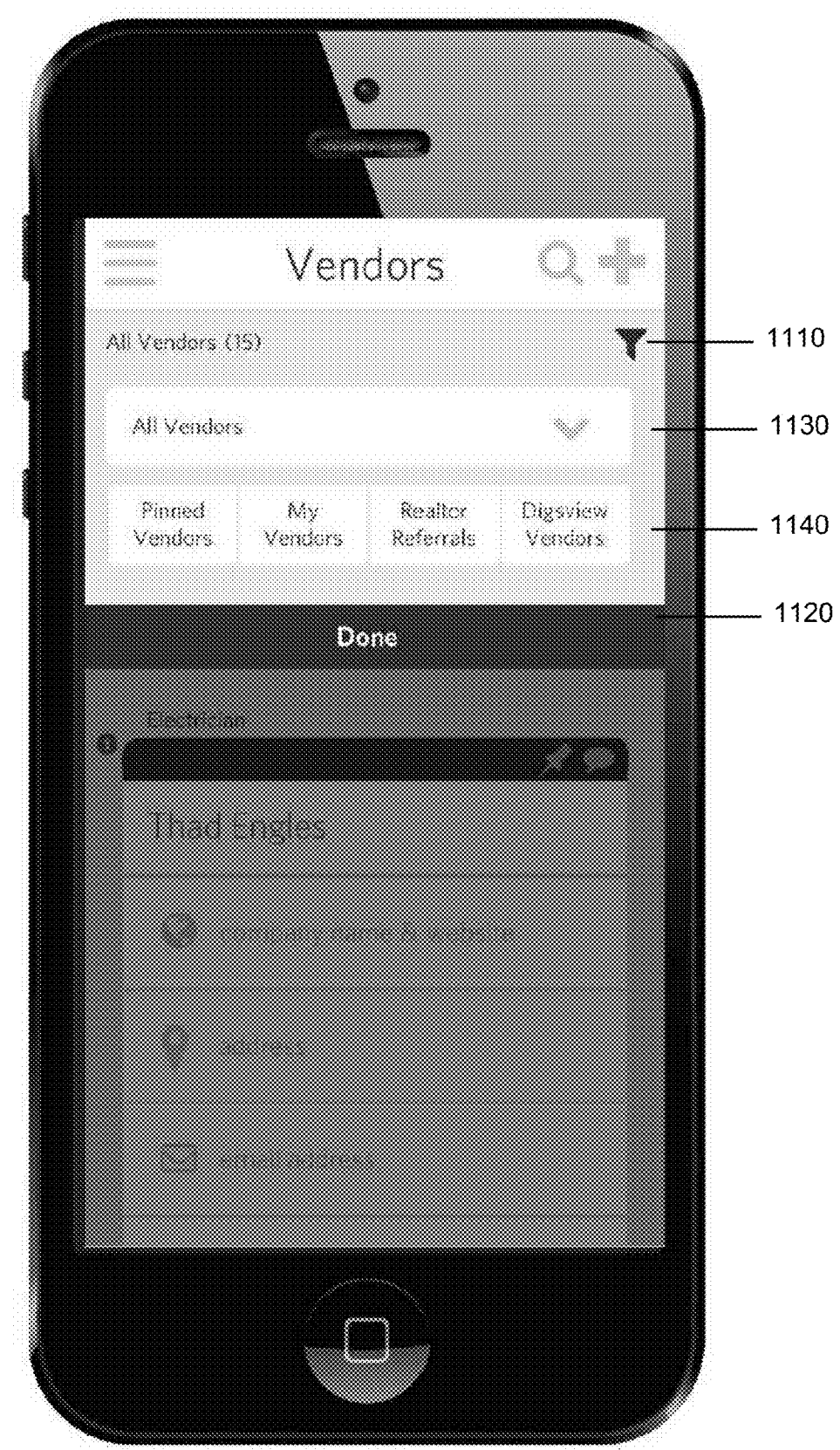
FIG. 11 shows an example of a service provider user interface after a user has indicated the user is done.
Figure 12:
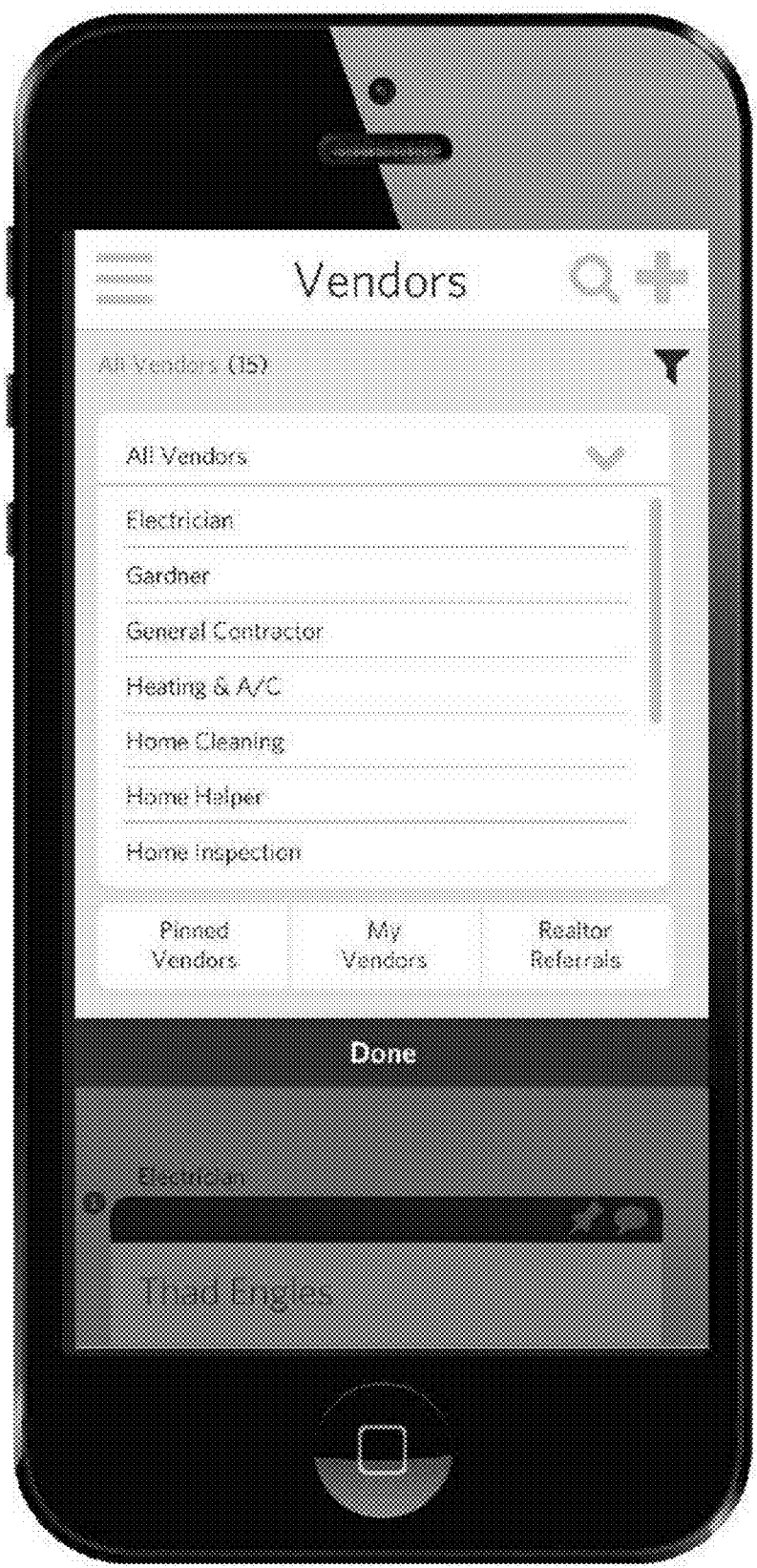
FIG. 12 shows examples of service provider categories.

FIG. 11 shows an example of a service provider user interface after a user has indicated the user is done. In some instances, selecting an icon 1110 on the user interface may permit the user to indicate that the user is done 1120 with viewing a particular vendor's information. In some instances, a vendor category 1130 may be presented. The vendor category may be presented as a drop down menu. Examples of vendor categories are shown in FIG. 12. The vendor category may include all vendors or may include specialized fields. Users may be able to add their own categories of vendors or customize vendor categories. The vendor categories may be scrolled through.

Various vendor pools 1140 may be displayed. In some instances, vendor pools may be displayed according to vendor list. For example, quick options may be presented for pinned vendors, my vendors, real estate agent recommendations, and/or platform vendors. One, two, three or more of these quick options may be presented. A user may select a vendor pool (e.g., 'real estate agent recommendations') to access the vendors recommended by the real estate agent. The user may then select a vendor category (which may include all real estate agent recommendations, or specific specialties, such as electrician). This may help the user quickly access different pools of information.

For instance, a user may wish to access the user's existing vendors that the user has worked with first. The user may select a 'my vendors' pool and search for an electrician. If it turns out that the user does not already have a preferred electrician, the user may view recommendations from the real estate agent. The user may select the 'real estate agent recommendations' pool and search for electricians that the real estate agent suggests. The user may select different vendor pools to quickly switch with one touch or click.

Figure 13:
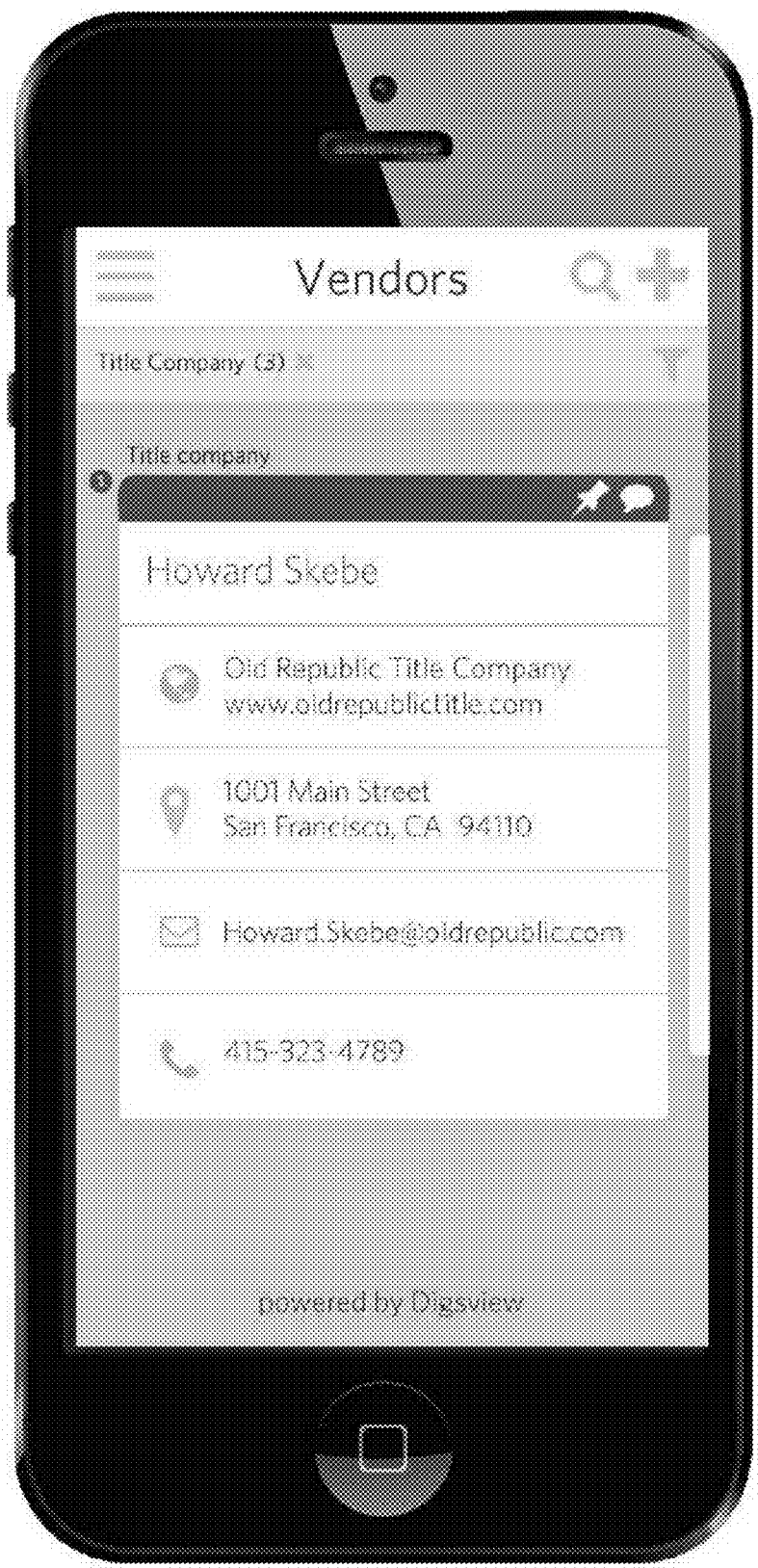
FIG. 13 provides an additional example of a user interface showing information about a service provider.

FIG. 13 provides an additional example of a user interface showing information about a service provider. The service provider pool 1310 may be presented as a service provider category. For example, the service provider pool may be title companies. The total number of service providers within the pool may be shown.

Figure 14:
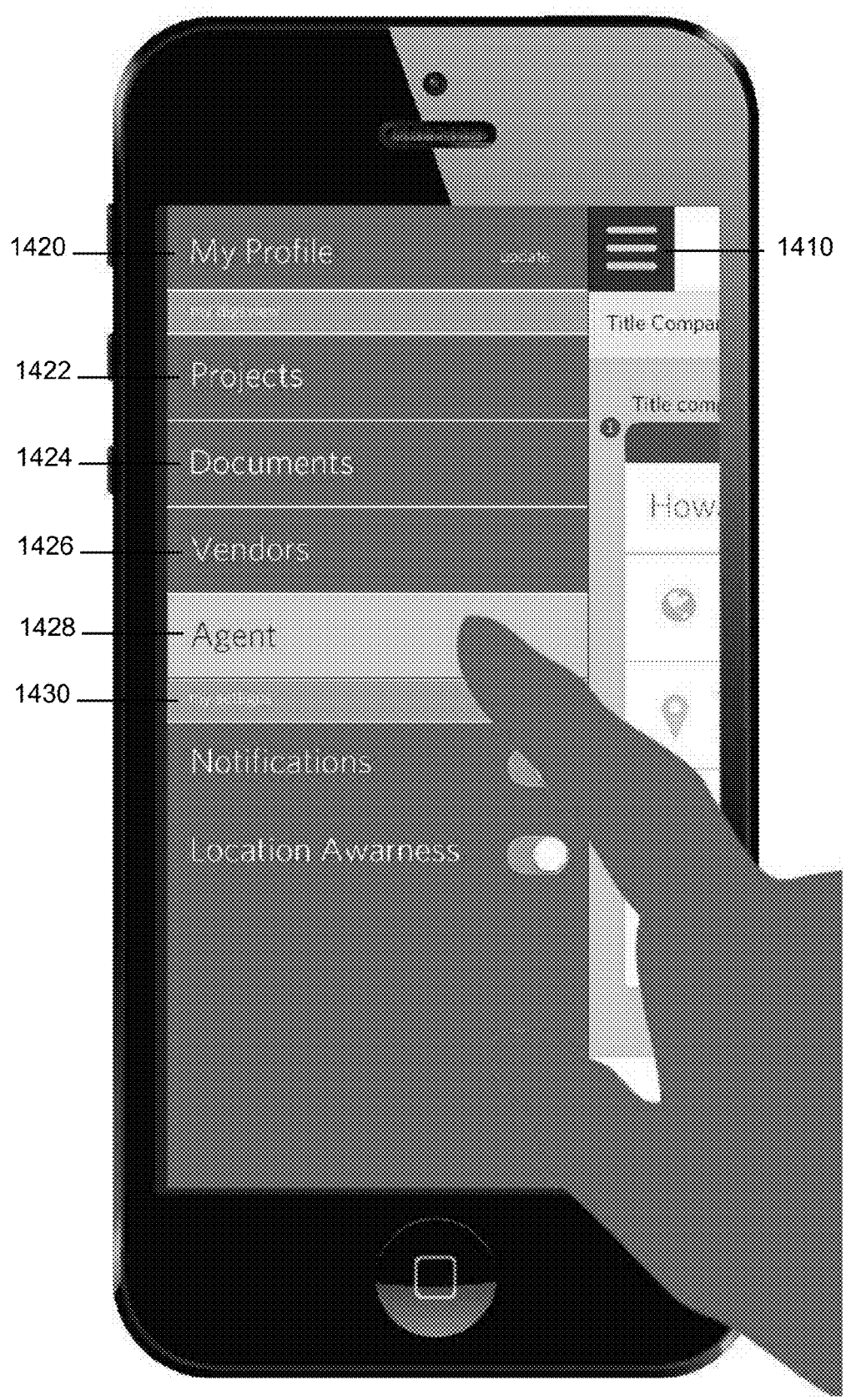
FIG. 14 shows an example of a navigation tool for the real estate platform user interface.

FIG. 14 shows an example of a navigation tool for the real estate platform user interface. For example, selecting a region 1410 of the user interface may cause a side menu to show up. The side menu may include sections the user may use to navigate the site. For example, the side menu may include options for a user to view his or her profile 1420, projects 1422, documents 1424, vendors 1426, and/or agent 1428. The user may also be able to adjust the user's settings 1430, such as notifications and location awareness settings. Selecting an option may navigate the user to a user interface showing the selected information.

As previously discussed, selecting a documents section may permit a user to access documents relating to the user's home. The system may advantageously permit a user to easily access electronic versions of all documents that the user may need in relation to the user's home. These documents may be pulled from multiple sources.

Selecting an agent may cause a user to navigate to a user interface showing information personalized to the user's real estate agent.

Figure 15:
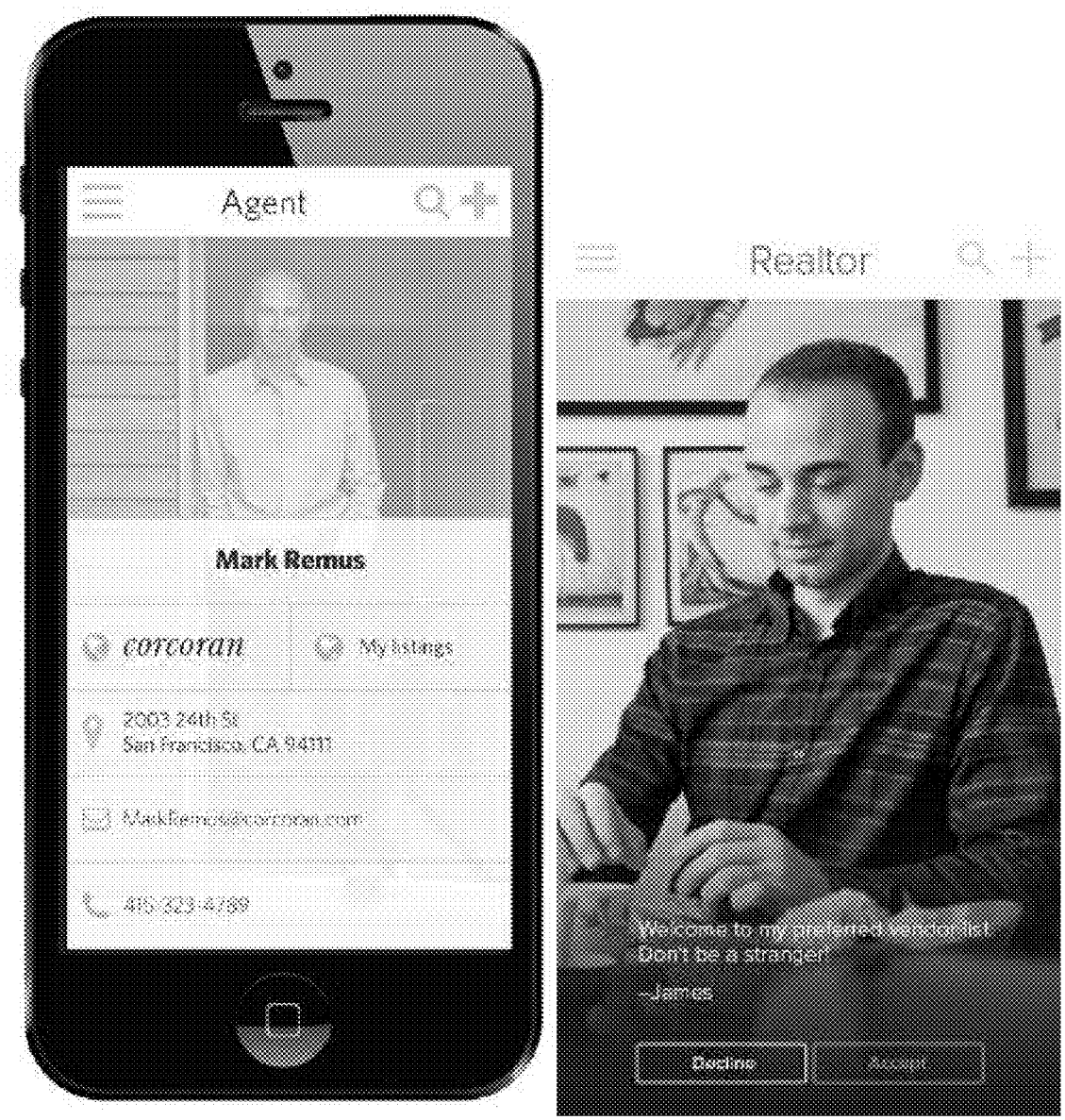
FIG. 15 shows examples of user interfaces showing information personalized to a real estate agent.

FIG. 15 shows examples of user interfaces showing information personalized to a real estate agent. In some embodiments, an image of the real estate agent may be provided. In some examples, a general page may show information about the real estate agent, such as name, contact information, and an option to view the real estate agent's listings. In some embodiments, selecting the contact information may cause the agent to be directly contacted. For example, selecting the email address may cause an email to be sent to the real estate agent, or open up an interface through which the user may email the real estate agent. Selecting the phone number may cause the real estate agent's phone to be dialed.

In some embodiments, a real estate agent may invite a homeowner to view the real estate agent's preferred vendor list. This invitation may be sent through the application. The homeowner may indicate whether the homeowner accepts or declines the invitation. In some embodiments, a homeowner may only have access to the real estate agent's preferred vendor list if the homeowner receives and accepts an invitation from the real estate agent. In other implementations, once a homeowner has established the relationship with his or her real estate agent, the homeowner may be able to access the real estate agent's vendor list.

Figure 16:
FIG. 16 shows an example of a search interface for vendors.

FIG. 16 shows an example of a search interface for vendors. A user may type in a vendor's name. The name options that fit the typed portion of the name may be displayed. For example, if the user types a first letter, all names starting with that letter (e.g., first name only, last name only, or first or last name) may be displayed. If a user types in a second letter, all names starting with the combination of the first and second letter may be displayed. In some instances, the names displayed may be all vendors within the vendor pool. In other instances, the names displayed may be all vendors in the pool that also fits a selected vendor category.

Figure 17:
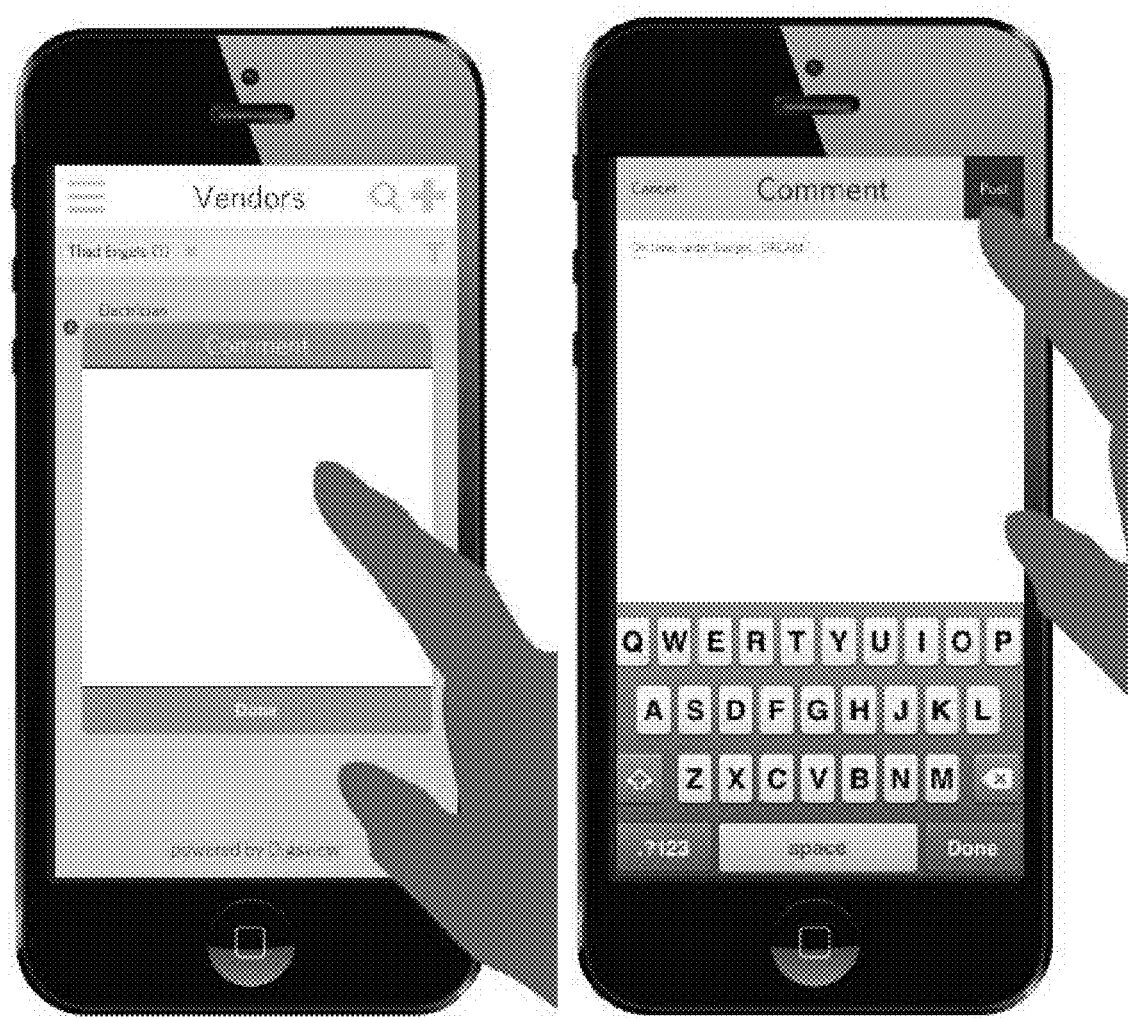
FIG. 17 shows examples of a user interface through which a user can enter comments about a vendor.

FIG. 17 shows examples of a user interface through which a user can enter comments about a vendor. In some instances, when viewing vendor information, an icon may be presented that a user may select to view a comment pane. The user may freely type notes into the comment pane and post the comments. This may be useful for the user to provide personal details or accounts of the user's interactions with the vendor or thoughts about the vendor.

In some embodiments, the user posting the comments may be the real estate agent. The real estate agent's notes may be private so that only the real estate agent can view the real estate agent's notes. This may be useful when the real estate agent wants to remember personal interactions with the vendor but may not necessarily want to share this information with everyone. Alternatively, the notes may be public so that other users that access the real estate agent's vendor recommendations may also see the real estate agent's notes. This may be useful in scenarios where the real estate agent wants to provide the real estate agent's personal impressions of the vendors to the homeowners.

The user posting the comments may be a homeowner in other implementations. The homeowner may have used or interacted with the vendor and may wish to provide comments or notes for himself or herself. These notes may be private and may not be viewed by other users. Alternatively, these notes may be public and shared with anyone else where may be considering the vendor.

Figure 18:
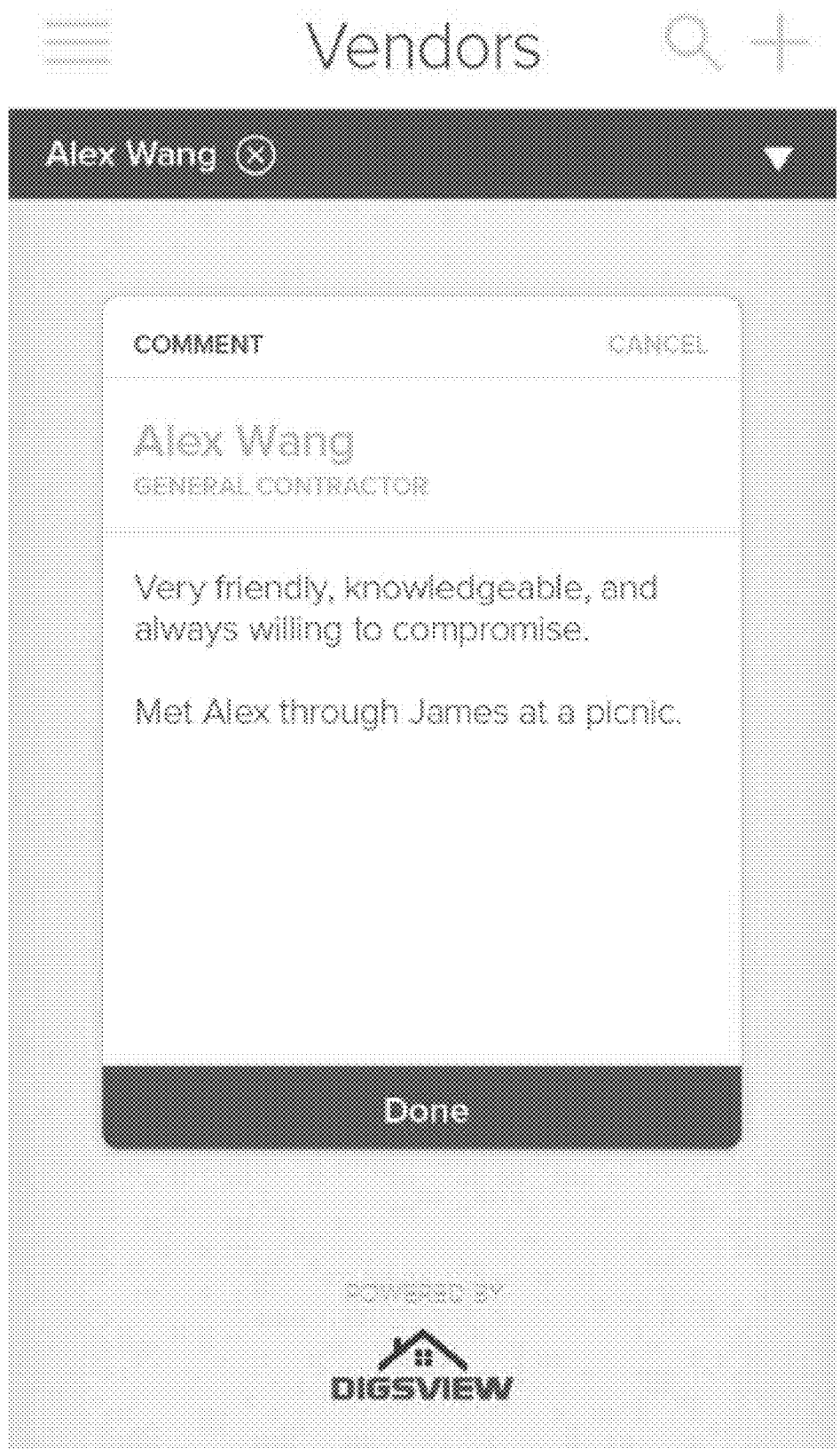
FIG. 18 shows an additional example of a user interface through which a user can enter or view comments about the vendor.

FIG. 18 shows an additional example of a user interface through which a user can enter or view comments about the vendor. In some instances, previous notes may exist from previous entries (by the same user who is viewing the comments or by a different user). The user may modify or add notes. In some embodiments, if a user is viewing notes created by another user, the user may not modify or delete the existing notes. The user may or may not be able to add to the notes. A user may be able to modify, delete, or add to notes that he or she initially provided.

Figure 19:
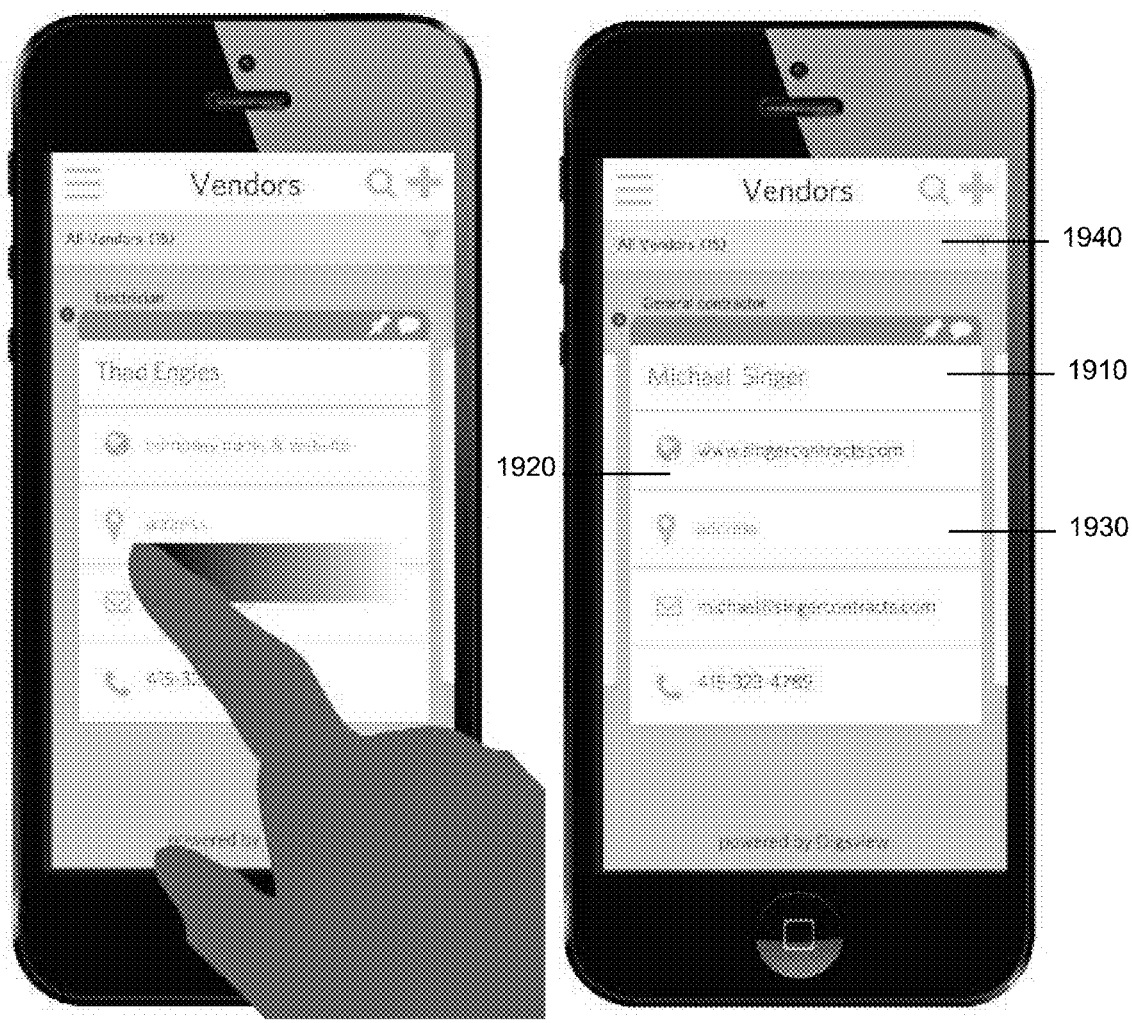
FIG. 19 shows an example of a user interface through which a user may view different vendors.

FIG. 19 shows an example of a user interface through which a user may view different vendors. For example a user may swipe to view different vendor information. A vendor information panel 1910 may be presented showing information about a vendor. In some instances, a previous vendor information panel 1920 and a subsequent vendor information panel 1930 may be provided adjacent to the vendor information panel. A user may swipe to move onto the previous or subsequent vendor information panel.

In some instances, the vendor information panels may belong to a selected pool of vendors 1940. For example, an indication may be provided of the vendor pool. For example, 'all vendors' may be selected. Thus, when a user performs a fingerswipe on a user display, all vendors may be accessible. In another example, the pool of vendors may be limited by vendor category. For example, the vendor pool may be for all electricians. Then all of the vendors that may be displayed below and accessed via swiping may be electricians.

Figure 20:
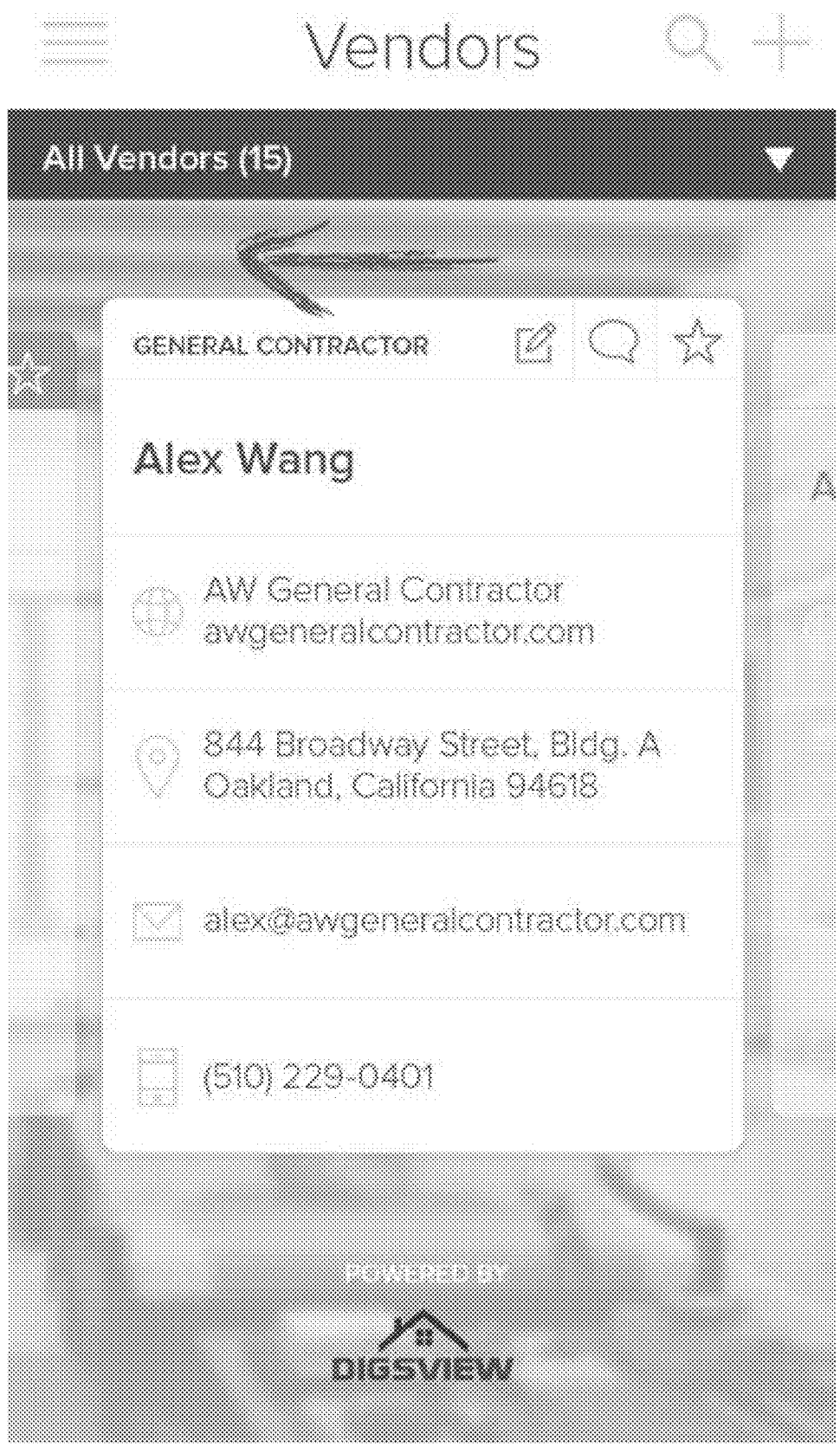
FIG. 20 provides an additional example of a user interface through which a user may view different vendors via swiping.

FIG. 20 provides an additional example of a user interface through which a user may view different vendors via swiping. A lateral swipe may be made to show a laterally adjacent other vendor.

Figure 21:
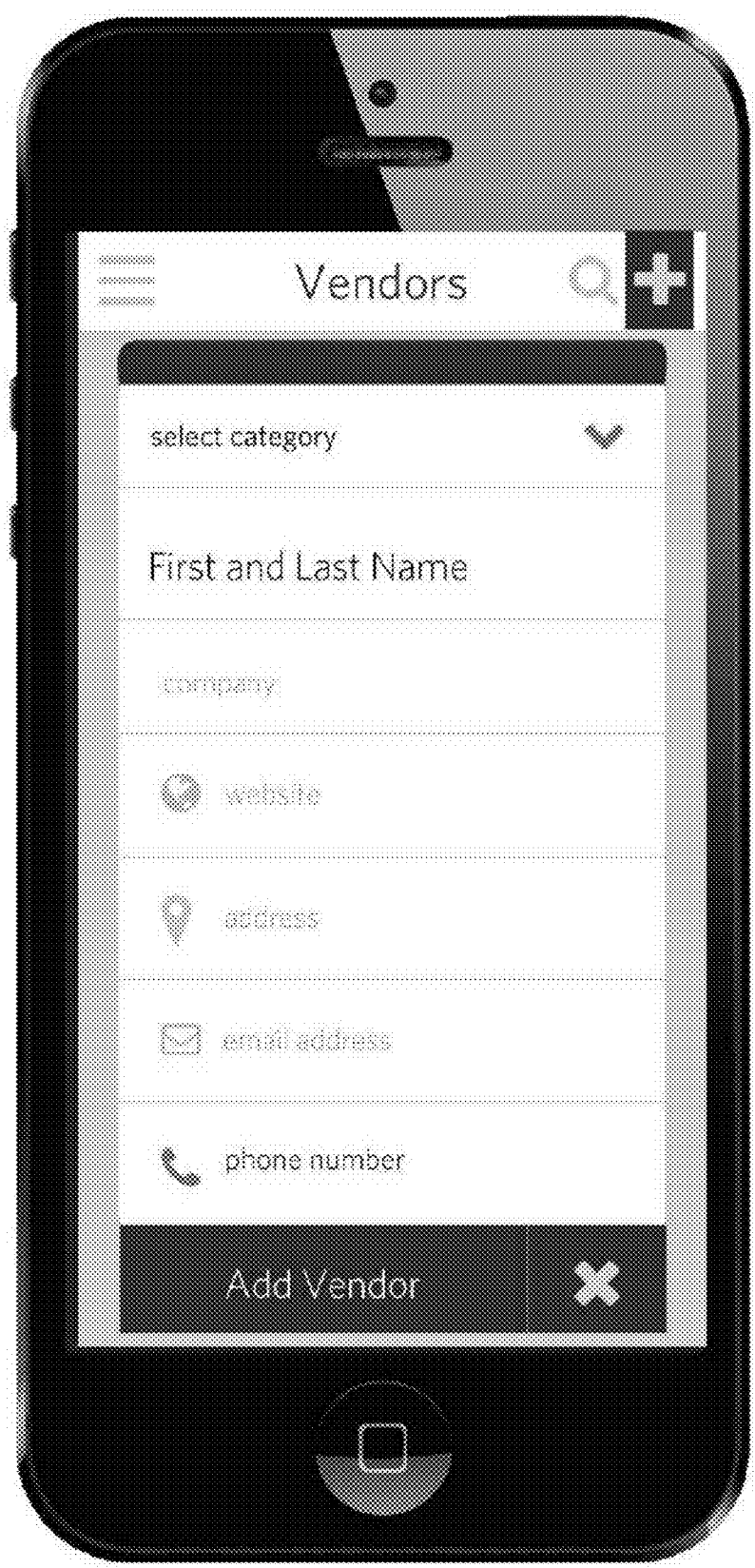
FIG. 21 provides an example of a user interface through which a new vendor may be added.

FIG. 21 provides an example of a user interface through which a new vendor may be added. A vendor name, company information, website information, address, email address, and/or phone number may be entered. In some instances, not all fields need to be filled. An option may be provided to select a vendor category. In some embodiments, a drop down menu may be presented with a plurality of vendor categories, and the user may select a vendor category from the plurality of category options.

Figure 22:
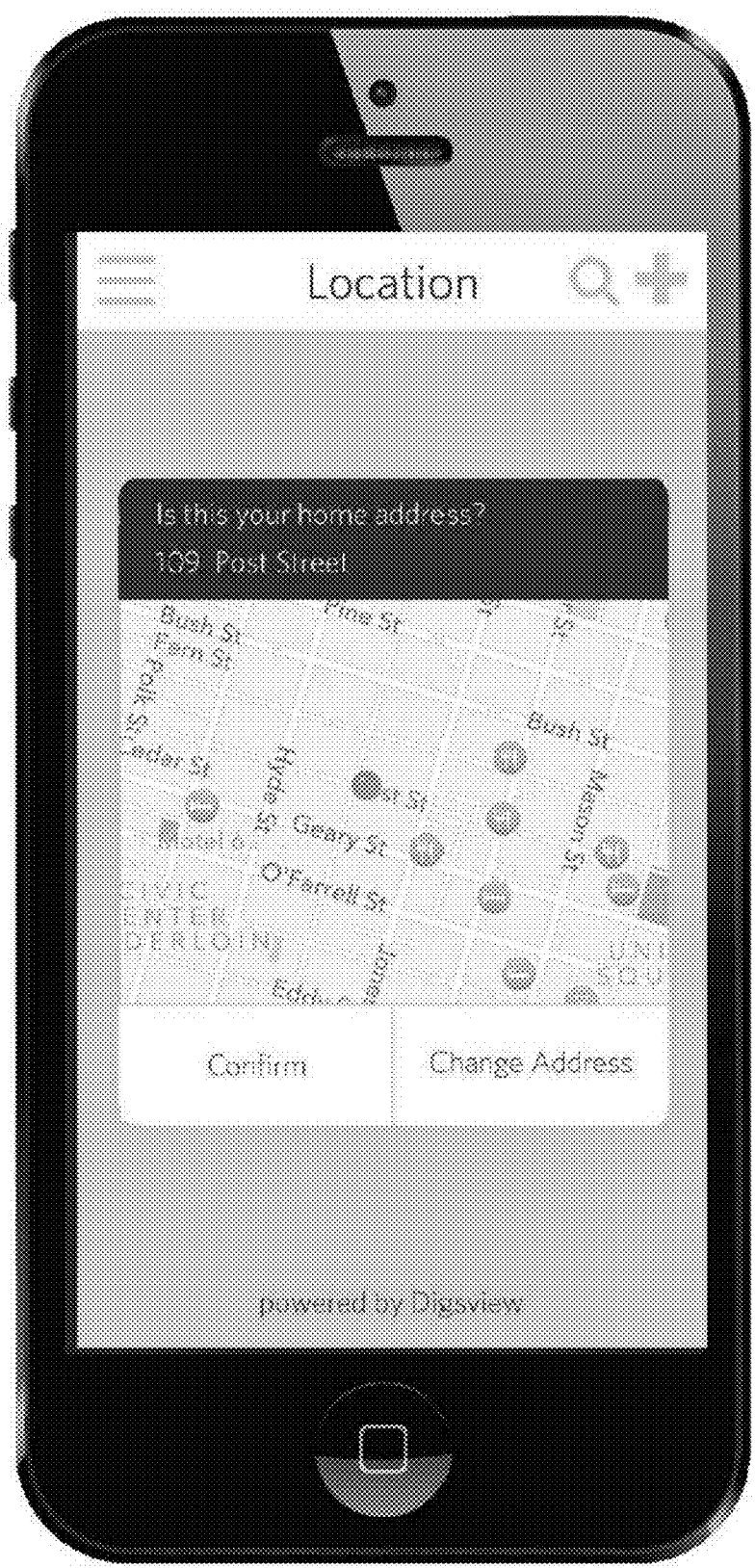
FIG. 22 shows an example of a user interface where a user's home location may be verified.

FIG. 22 shows an example of a user interface where a user's home location may be verified. In some embodiments, a user device may have geo-location features, such as GPS or location triangulation. The geo-location features may be used to detect the location of the user device. In some instances, this information may be used to determine a user's home location. Alternatively, a user's home location may be determined based on information entered by the user or collected from a real estate agent.

Figure 23:
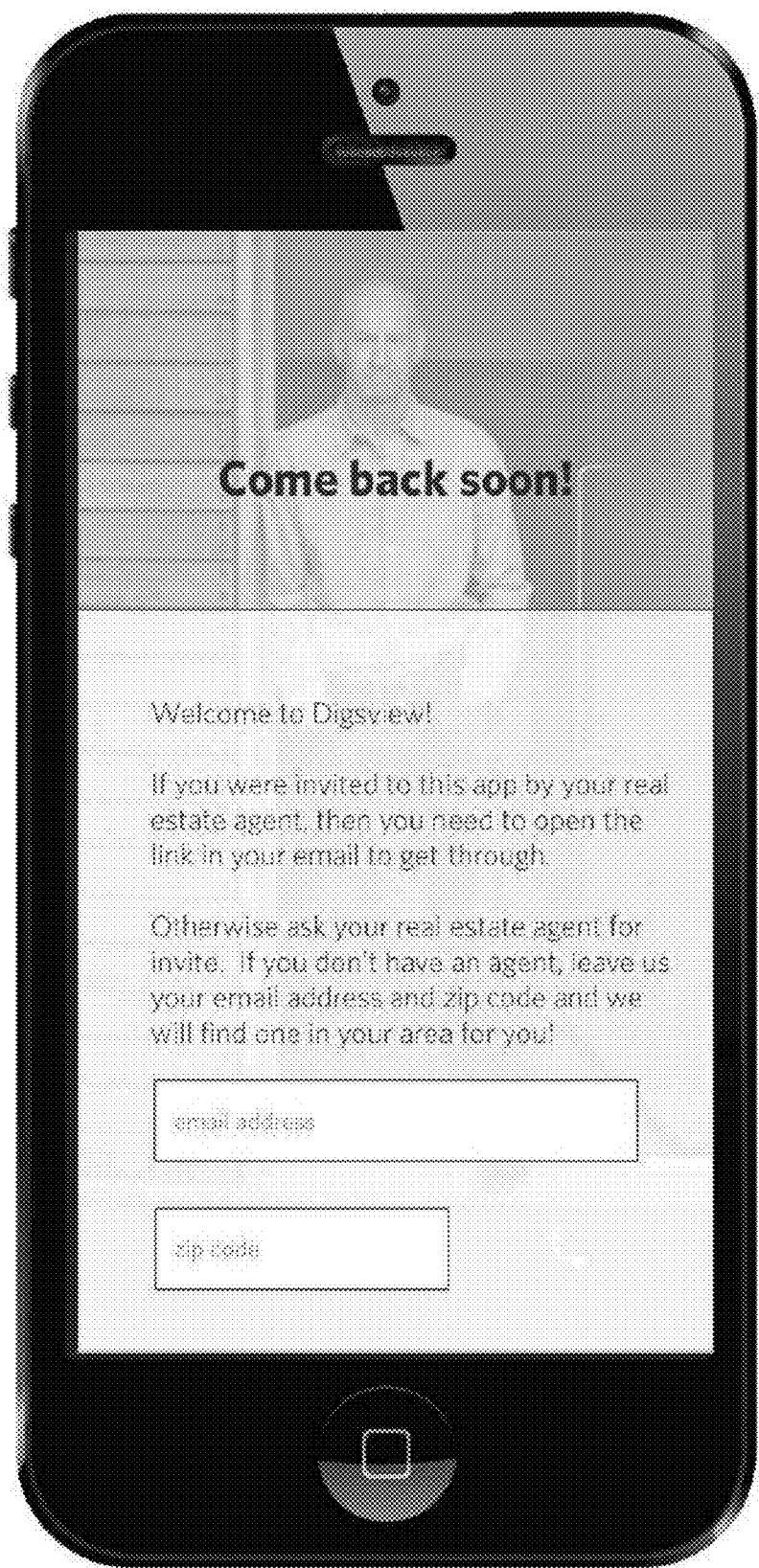
FIG. 23 shows an example of a user interface that may be displayed when a user attempts to access the real estate platform without using an invitation.

FIG. 23 shows an example of a user interface that may be displayed when a user attempts to access the real estate platform without using an invitation. For example, if the user was invited to the platform by the user's real estate agent, it may be required for the user to access the platform initially through a link provided by the real estate agent. If the user does not have a real estate agent, the platform may locate a real estate agent for the user that uses the platform, and is in the user's region.

Figure 24:
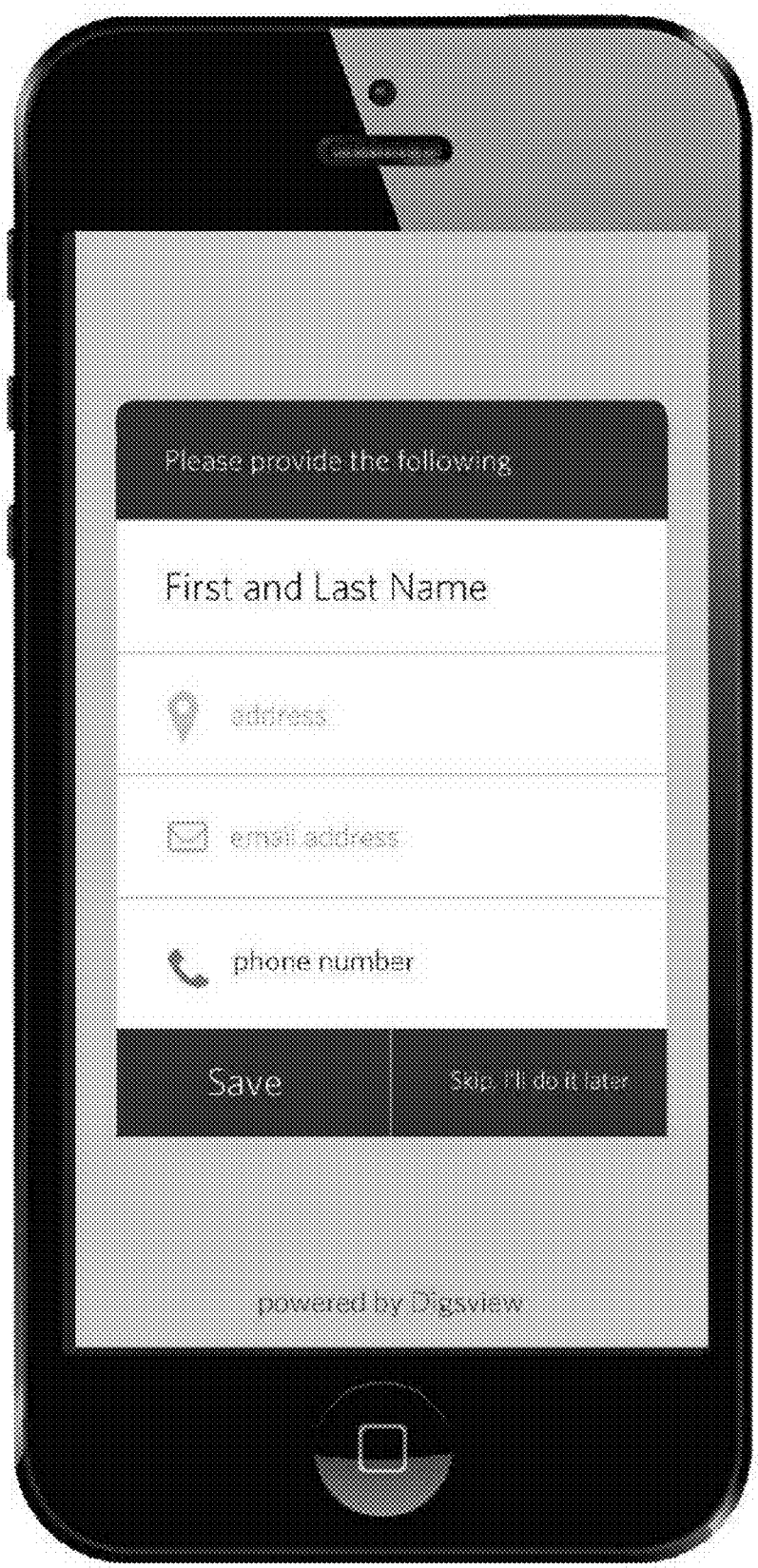
FIG. 24 is an example of a user interface through which a user may create a user account with the platform.

FIG. 24 is an example of a user interface through which a user may create a user account with the platform. For example, a user's name, and contact information (e.g., address, email address, phone number) may be entered.

Figure 25:
FIG. 25 provides an example of a user interface shown on a web platform (e.g., accessible via a web browser).

FIG. 25 provides an example of a user interface shown on a web platform (e.g., accessible via a web browser). A web interface may use similar user interfaces to a mobile platform. Alternatively, there may be some variation.

When a user accesses the platform via a web interface, options may be provided for a user to view the user's home information, and/or service provider information.

Figure 26:
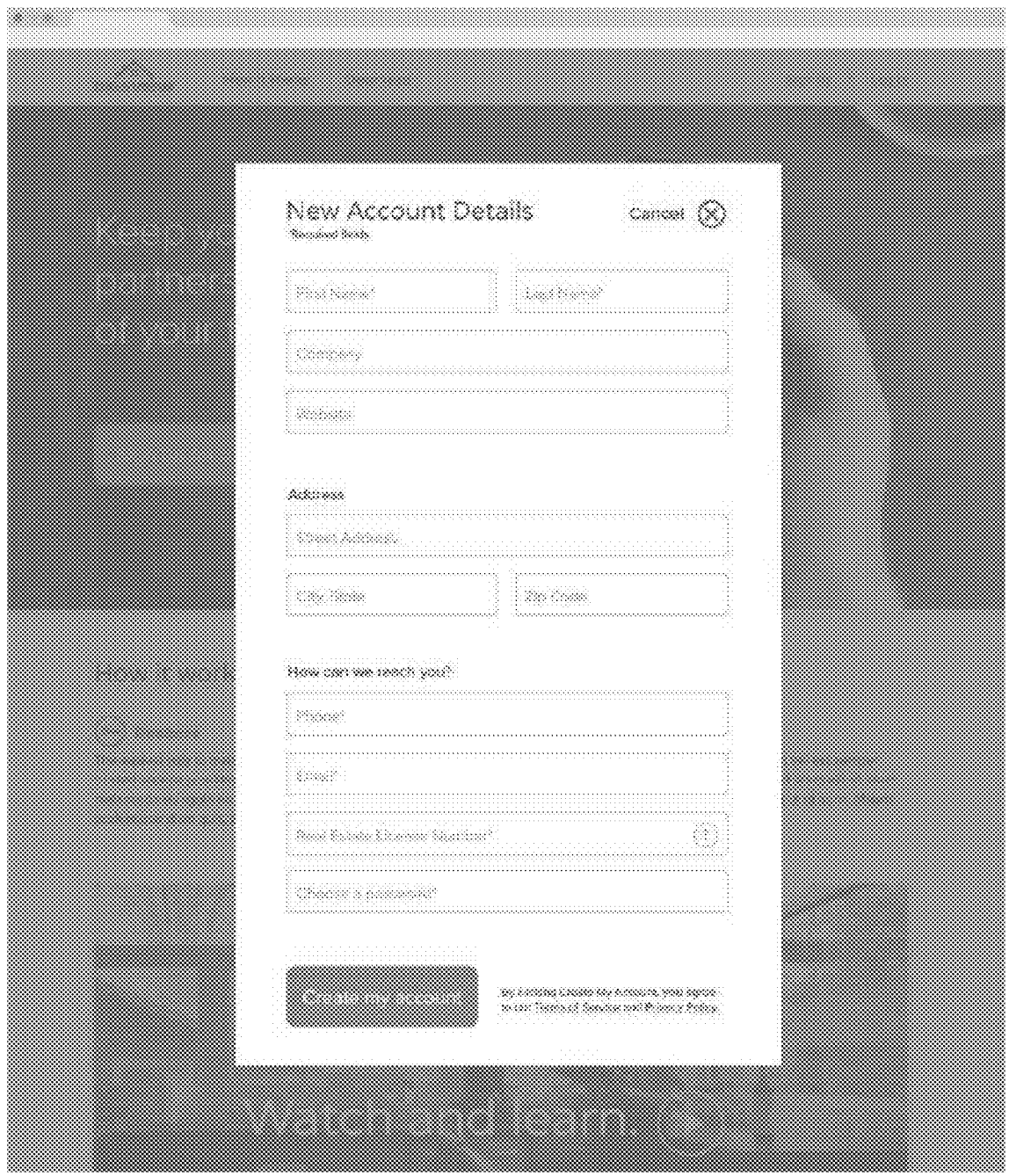
FIG. 26 provides an example of a user interface when a user is creating a new account.

FIG. 26 provides an example of a user interface when a user is creating a new account. A user may enter the user's name, company, website, address, and contact information. In some instances, the user may be a real estate agent, and the information may include a real estate license number. In other instances, the user may be a homeowner (which may include a home buyer or seller). In some instances, a user may be presented with an option to create a password or other form of authentication.

Figure 27:
FIG. 27 is an example of a user interface through which a team and/or client list may be managed.

FIG. 27 is an example of a user interface through which a team and/or client list may be managed. In some examples, the user may be a real estate agent and the user may manage information relating to other members of the real estate agent's team. In some other implementations, the user may be a homeowner and may manage information relating to service providers that have been selected by the homeowner to be part of the homeowner's team. The team may be a real property team. Members of the team may include a real estate agent's or homeowner's trust service providers. For example, a user may view information of service providers in different categories (e.g., electrician, mover, home lender, general contractor, interior design, constructions, insurance agent). Information for each member of the team may be displayed in a team member panel 2710a, 2710b. Multiple team member panels may be simultaneously displayed on the user interface. In some instances, the team member panels may be displayed in one or more rows, one or more columns, or an array. In some instances, multiple team member panels may fit on a UI of a web-based application while a single team member panel (e.g., vendor panel) may be simultaneously displayed on a mobile application.

The user interface may include a region to enter a new team member. The user may enter information such as a category (e.g., service provider category), name, company, website, address, email address and/or phone number. The user may be able to modify the positions of the team member panels. In some instances, the user may be able to sort the team member panels by service provider category, name, stars or ratings, or any other parameter. The user may manually adjust the positions or orders of the service providers displayed. In some embodiments, a team pool 2712 (e.g., all team members, different categories of members) may be selected for display. The type of sorting scheme 2714 to be utilized may also be selected.

The user interface may also show a client list. In some examples, a user may be a real estate agent, and the real estate agent's clients may be displayed in a client list. The client name, address, phone number, email, and/or invite status may be displayed. The user may be able to add, delete or edit client information. An add client region 2720 may be presented through which the user may add a client. In some instances, the invite status 2730 may be indicative of whether the client has created an account with the platform and/or accepted the real estate agent's invitation to be connected to the client. This may also be indicative of whether the client has accepted access to the real estate agent's list of recommended service providers/members of the real estate agent's teams.

The user may be able to modify the order of the clients displayed. In some instances, the user may be able to sort the clients by client category, name, stars or ratings, or any other parameter. The user may manually adjust the positions or orders of the clients displayed. In some embodiments, a client pool 2740 (e.g., all clients, different categories of clients) may be selected for display. The type of sorting scheme 2750 to be utilized may also be selected.

Figure 28:
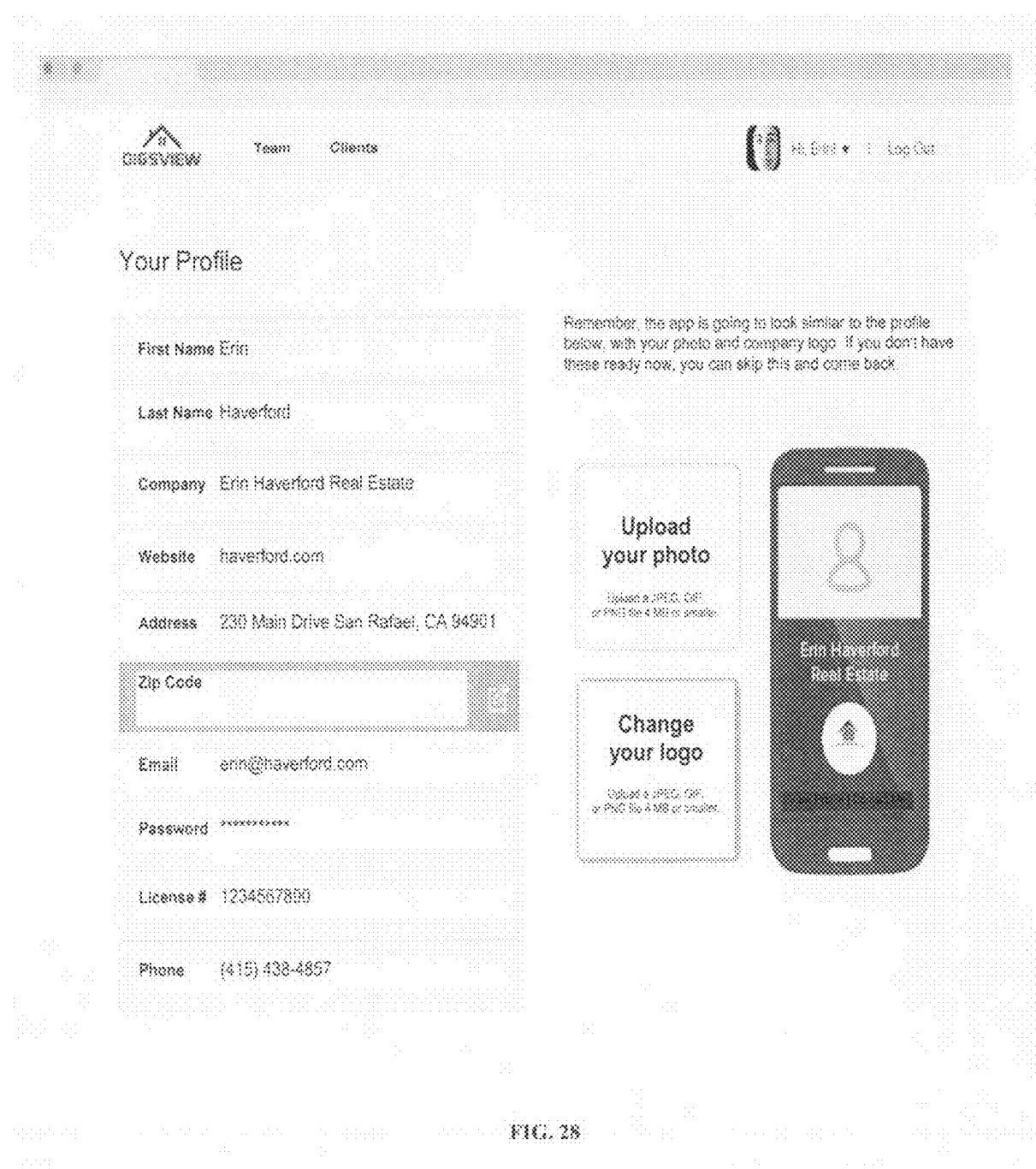
FIG. 28 provides an example of a user interface through which a user may manage the user's profile.

FIG. 28 provides an example of a user interface through which a user may manage the user's profile. In some instances, the user may be a real estate agent who may manage his or her profile. The user may enter, delete, or modify information, such as the user's name, company, website, address, email, password, license number, and/or phone number. The user may also be provided with options to upload a photo and/or change a logo. The user may also be able to access team information and/or client information via one or more links.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of providing vendor recommendations, said method comprising:

receiving, from a user device comprising a processor and a user interface, a request to access personalized information for a real estate agent;

accessing a memory, with aid of a processor, storing the personalized information for the real estate agent, which includes the real estate agent's personal vendor recommendations;

transmitting, to the user device, the personalized information for the real estate agent to be displayed on the user interface of the user device, wherein the user interface permits a user of the user device to search and access the real estate agent's personal vendor recommendations;

displaying, on the user interface of the user device, the real estate agent's personal vendor recommendations along with personalized comments by the real estate agent about the vendor recommendations; and displaying, on the user interface of the user device, the real estate agent's personal vendor recommendations along with a space for the user to enter personalized comments about the vendor recommendations so that the personalized comments are viewable by the user and are not viewable by the real estate agent.

2. The method of claim 1 wherein the user interface includes a search field that is configured to permit the user to search the real estate agent's personal vendor recommendations by vendor category.

3. The method of claim 2 wherein the vendor category is selectable from a plurality of available vendor categories.

4. The method of claim 3 wherein the plurality of available vendor categories include two or more of the following: general contractors, architects, engineers, electricians, flooring specialists, roofing specialists, cleaning specialists, window specialists, painters, landscape architects/gardeners, plumbers, handyman specialists, pool specialists, driveway specialists, heating and air conditioning specialists, home inspection, or mortgage lenders.

5. The method of claim 1 wherein the user is permitted to access the real estate agent's personal vendor recommendations when the real estate agent has a pre-existing relationship with the user, and the user is not permitted to access the real estate agent's personal vendor recommendations when the real estate agent does not have a pre-existing relationship with the user.

6. The method of claim 1 wherein the memory storing the personalized information for the real estate agent is remote from the user device.

7. The method of claim 1 wherein the user interface also provides access to real property information of the user.

8. The method of claim 7 wherein the real property information includes two or more of the following: home title documents, closing documents, inspection reports, mortgage information, floor plans, or service information.

9. The method of claim 7 wherein the real property information is stored at one or more data sources that are owned or operated by a separate entity from the entity providing the user interface.

10. The method of claim 1 further comprising displaying the real estate agent's personal vendor recommendations along with contact information for the vendor recommendations.

11. The method of claim 1 further comprising displaying the real estate agent's personal vendor recommendations that are within a geographic proximity of the user or the user's property.

12. The method of claim 11 wherein the user device includes a geo-location feature that provides a global location of the user device.

13. The method of claim 1 wherein the user interface shows information about a single vendor recommendation at a time.

14. The method of claim 13 wherein the user interface is configured to permit the user to navigate between vendor recommendations via fingerswipe that causes a different vendor recommendation to be displayed.

15. A system for providing vendor recommendations, said system comprising:

a user device comprising a processor and a user interface, said user device configured to provide a request to access personalized information for a real estate agent;

one or more memory units configured to store the personalized information for the real estate agent, which includes the real estate agent's personal vendor recommendations; and one or more processors configured to access the personalized information for the real estate agent from the one or more memory units, wherein the personalized information for the real estate agent along with personalized comments by the real estate agent about vendor recommendations are transmitted to the user device to be displayed on the user interface of the user device, wherein the user interface permits a user of the user device to search and access the real estate agent's personal vendor recommendations and provides a space for the user to enter personalized comments about the vendor recommendations so that the personalized comments are viewable by the user and are not viewable by the real estate agent.

16. The system of claim 15 wherein the one or more memory units store personalized information for multiple real estate agents, which includes personal vendor recommendations for the multiple real estate agents.

17. The system of claim 16 wherein the user is permitted to search and access the personal vendor recommendations for the user's real estate agent, with whom the user has a pre-existing relationship.

18. The system of claim 16 wherein the user is permitted to search and access the personal vendor recommendations for the multiple real estate agents.

* * * * *